US012793630B2

(12) United States Patent
Lee

(10) Patent No.: US 12,793,630 B2
(45) Date of Patent: Nov. 10, 2026

(54) ELECTRONIC DEVICE AND METHOD FOR DRIVING ELECTRONIC DEVICE

(71) Applicant: Samsung Display Co., Ltd., Yongin-si (KR)

(72) Inventor: Heechul Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/307,450

(22) Filed: Aug. 22, 2025

(65) Prior Publication Data

US 2026/0087979 A1    Mar. 26, 2026

(30) Foreign Application Priority Data

Sep. 20, 2024 (KR) ........................ 10-2024-0127177

(51) Int. Cl.

| | |
|---|---|
| ***G09G 3/3225*** | (2016.01) |
| ***G06F 3/041*** | (2006.01) |
| *G06F 3/044* | (2006.01) |
| *G09G 3/32* | (2016.01) |

(52) U.S. Cl.

CPC ......... *G09G 3/3225* (2013.01); *G06F 3/0412* (2013.01); *G06F 3/04164* (2019.05); *G06F 3/0446* (2019.05); *G09G 3/32* (2013.01); *G09G 2330/027* (2013.01); *G09G 2330/045* (2013.01); *G09G 2330/12* (2013.01); *G09G 2354/00* (2013.01)

(58) Field of Classification Search

CPC .. G09G 3/3225; G09G 3/32; G09G 2330/027; G09G 2330/045; G09G 2330/12; G09G 2354/00; G06F 3/0412; G06F 3/04164; G06F 3/0446

See application file for complete search history.

(56) References Cited

U.S. PATENT DOCUMENTS

| | | | | |
|---|---|---|---|---|
| 11,250,747 B2 * | 2/2022 | Park | G09G 3/3266 | |
| 2005/0270059 A1 * | 12/2005 | Ando | G09G 3/006 | 324/760.01 |
| 2008/0180588 A1 * | 7/2008 | Ando | G09G 3/3648 | 349/37 |
| 2011/0281489 A1 * | 11/2011 | Tannas, Jr. | G02F 1/133351 | 445/2 |

(Continued)

OTHER PUBLICATIONS

Yi, Zhehan, et al., "Line-to-Line Fault Detection for Photovoltaic Arrays Based on Multi-resolution Signal Decomposition and Two-stage Support Vector Machine," IEEE Transactions on Industrial Electronics, vol. 64, Issue: 11, 2017, 10 pages.

*Primary Examiner* — Jeff Piziali

(74) *Attorney, Agent, or Firm* — Womble Bond Dickinson (US) LLP

(57) ABSTRACT

An electronic device includes: a display panel including a plurality of lines including: a first line; and a second line adjacent to the first line; and a driving circuit to drive the display panel, and including: a signal providing unit to provide a first signal to the first line, and a second signal different from the first signal to the second line; a voltage sensing unit to sense a voltage of each of the first line and the second line; and a power cut-off unit to cut off power of the display panel for a recovery period, based on the voltage. The driving circuit is to re-drive the display panel after the recovery period.

13 Claims, 12 Drawing Sheets

(56) References Cited

U.S. PATENT DOCUMENTS

| | | | | |
|---|---|---|---|---|
| 2016/0155380 A1* | 6/2016 | Kwon | G09G 3/3233 345/78 |
| 2016/0370926 A1* | 12/2016 | Lee | G06F 3/04186 |
| 2017/0294166 A1* | 10/2017 | Kim | G11C 19/28 |
| 2019/0213936 A1* | 7/2019 | Cho | G01R 31/52 |
| 2019/0340966 A1* | 11/2019 | Lee | G09G 3/3685 |
| 2020/0027379 A1* | 1/2020 | Kim | G01R 1/30 |
| 2021/0407349 A1* | 12/2021 | Choi | G09G 3/3696 |
| 2022/0319403 A1* | 10/2022 | Shiibayashi | G09G 3/32 |
| 2023/0138351 A1* | 5/2023 | Han | G09G 3/3233 345/212 |
| 2023/0196955 A1* | 6/2023 | Jang | G09G 3/006 345/204 |
| 2023/0196956 A1* | 6/2023 | Lee | G09G 3/006 324/760.01 |
| 2023/0196974 A1* | 6/2023 | Im | G09G 3/2096 345/212 |
| 2023/0215309 A1* | 7/2023 | Piao | G09G 3/006 345/204 |
| 2024/0221556 A1* | 7/2024 | Park | G09G 3/3233 |
| 2024/0265838 A1* | 8/2024 | Min | G09G 3/006 |

* cited by examiner

ELECTRONIC DEVICE AND METHOD FOR DRIVING ELECTRONIC DEVICE

CROSS-REFERENCE TO RELATED APPLICATION

The present application claims priority to and the benefit of Korean Patent Application No. 10-2024-0127177, filed on Sep. 20, 2024, in the Korean Intellectual Property Office, the entire disclosure of which is incorporated by reference herein.

BACKGROUND

Aspects of embodiments of the present disclosure relate to an electronic device having an improved reliability, and a method for driving the electronic device.

An electronic device may include a display layer to display an image, and a sensor layer to sense an external input. The sensor layer may be formed integrally with the display layer through a subsequent process. As another example, the sensor layer may be coupled to the display layer, after being formed through a process separate from a process for the display layer.

The display layer may include a plurality of lines to supply a signal or a voltage, and a short circuit may be caused between the plurality of lines. When a short circuit occurs between the lines of the display layer, a fire may occur in the display panel and/or the display panel may be damaged.

The above information disclosed in this Background section is for enhancement of understanding of the background of the present disclosure, and therefore, it may contain information that does not constitute prior art.

SUMMARY

Embodiments of the present disclosure provide an electronic device improved in reliability and a method for driving the same.

According to one or more embodiments of the present disclosure, an electronic device includes: a display panel including a plurality of lines, the plurality of lines including: a first line; and a second line adjacent to the first line; and a driving circuit configured to drive the display panel, and including: a signal providing unit configured to provide a first signal to the first line, and a second signal different from the first signal to the second line; a voltage sensing unit configured to sense a voltage of each of the first line and the second line; and a power cut-off unit configured to cut off power of the display panel for a recovery period, based on the voltage. The driving circuit is configured to re-drive the display panel after the recovery period.

In an embodiment, the display panel may further include: a display layer including a plurality of pixels; and a sensor layer on the display layer, and including a plurality of sensing electrodes.

In an embodiment, the plurality of lines may be electrically connected to the plurality of pixels, and the driving circuit may be configured to provide a data signal to the plurality of lines.

In an embodiment, the plurality of lines may be electrically connected to the plurality of sensing electrodes, and the driving circuit may be configured to provide a sensing signal to the plurality of lines.

In an embodiment, each of the first signal and the second signal may have a direct current (DC) voltage, and a voltage level of the first signal may be higher than a voltage level of the second signal.

In an embodiment, the power cut-off unit may be configured to cut off the power of the display panel when the voltage of the first line and the voltage of the second line have equal voltage levels as each other.

In an embodiment, the voltage sensing unit may include a multiplexer (MUX) circuit electrically connected to the plurality of lines, and the MUX circuit may be configured to sequentially select the plurality of lines, and select another line adjacent to a selected line from among the plurality of lines.

In an embodiment, the MUX circuit may be configured to output a first voltage and a second voltage corresponding to the first signal and the second signal, respectively.

In an embodiment, each of the first signal and the second signal may have an alternating current (AC) voltage, and the first signal may have a phase inverse to a phase of the second signal.

In an embodiment, the power cut-off unit may be configured to cut off the power of the display panel when the voltage is equal to '0' V (volt).

In an embodiment, the signal providing unit may be configured to concurrently provide the first signal to some lines among the plurality of lines, and sequentially provide the second signal to other remaining lines among the plurality of lines.

In an embodiment, the some lines may be odd-numbered lines, and the other remaining lines may be even-numbered lines.

In an embodiment, the signal providing unit may be configured to re-provide the first signal and the second signal after the recovery period is elapsed.

According to one or more embodiments of the present disclosure, a method for driving an electronic device, includes: providing, by a driving circuit, a first signal and a second signal different from the first signal to two lines adjacent to each other among a plurality of lines of a display panel; sensing, by the driving circuit, voltages of the two lines adjacent to each other; cutting off, by the driving circuit, a power of the display panel for a recovery period, based on the voltages; and re-driving, by the driving circuit, the display panel after the recovery period.

In an embodiment, each of the first signal and the second signal may have a direct current (DC) voltage, and a voltage level of the first signal may be higher than a voltage level of the second signal.

In an embodiment, the cutting off of the power may include: cutting off the power when the voltage level of the first signal becomes equal to the voltage level of the second signal.

In an embodiment, the providing of the first signal and the second signal may include: sequentially providing the first signal to the plurality of lines; and providing the second signal to another line adjacent to a line being provided with the first signal from among the plurality of lines.

In an embodiment, each of the first signal and the second signal may have an alternating current (AC) voltage, and the first signal may have a phase inverse to a phase of the second signal.

In an embodiment, the cutting off of the power may include: cutting off the power of the display panel when the voltages become equal to '0' V (volt).

In an embodiment, the providing of the first signal and the second signal may include: concurrently providing the first signal to odd-numbered lines among the plurality of lines; and sequentially providing the second signal to even-numbered lines among the plurality of lines.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
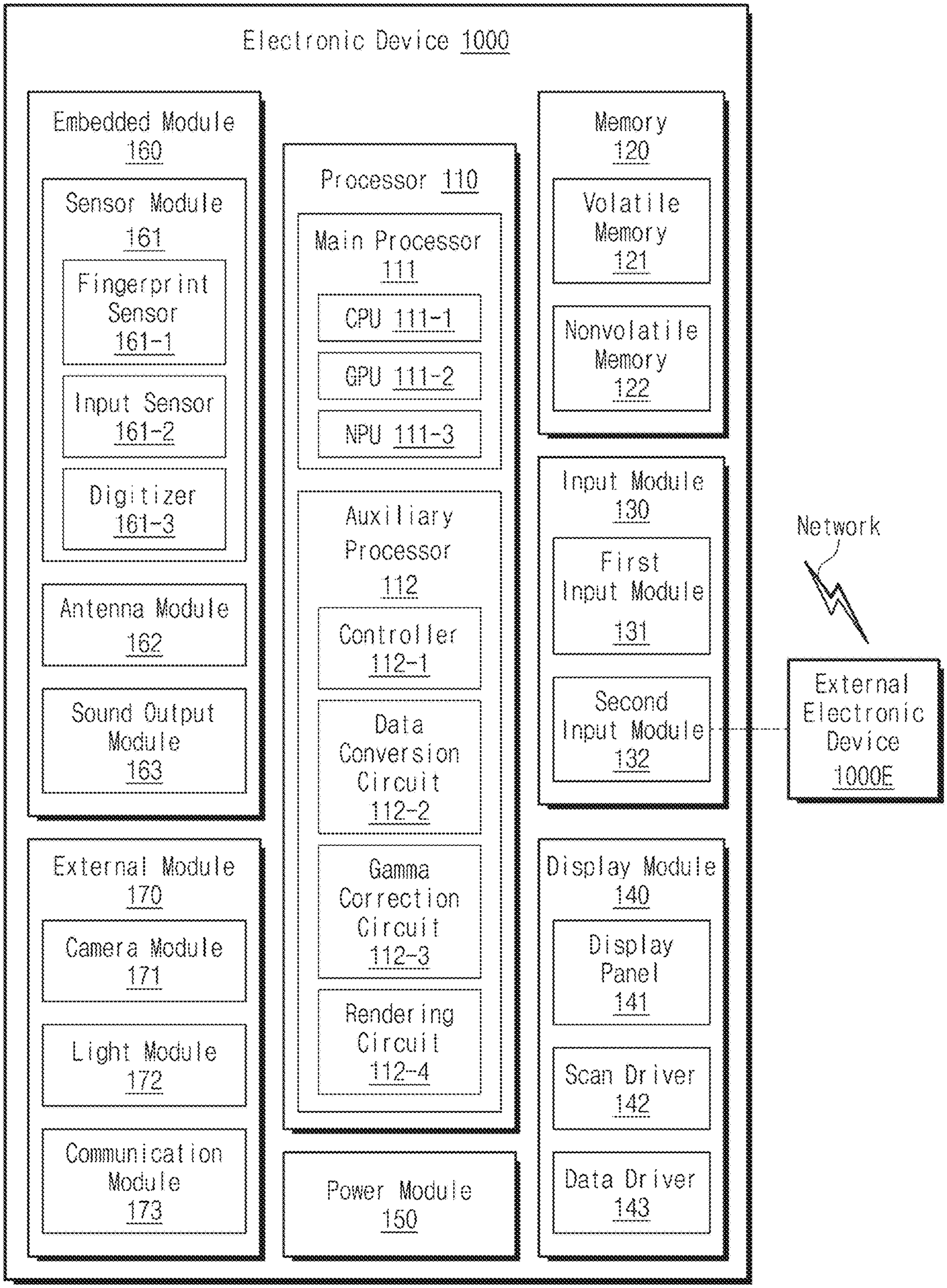
FIG. 1 is a block diagram illustrating an electronic device according to some embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The terms "part" and "unit" used herein may refer to a software component or a hardware component to perform a specific function. The hardware component may include a field-programmable gate array (FPGA) or an application-specific integrated circuit (ASIC). The software component may refer to executable code and/or data used by the executable code in an addressable storage medium. Accordingly, software components may be, for example, object-oriented software components, class components, and/or task components, and may include processes, functions, properties, procedures, subroutines, program code segments, driver data, firmware, micro-codes, circuits, data, database, data structures, tables, arrangements, and/or variables.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating an electronic device according to some embodiments of the present disclosure.

An electronic device 1000 may output a variety of information through a display module (e.g., a display or a touch-display) 140 in an operating system. When a processor 110 executes an application stored in a memory 120, the display module 140 provides a user with application information through a display panel 141.

The processor 110 obtains an external input through an input module 130 or a sensor module 161, and executes an application corresponding to the external input. For example, when a user selects a camera icon displayed in the display panel 141, the processor 110 obtains a user input through an input sensor 161-2, and activates a camera module 171. The processor 110 transfers image data corresponding to a photographed image obtained through the camera module 171 to the display module 140. The display module 140 may display an image corresponding to the photographed image through the display panel 141.

As another example, when authentication for personal information is performed in the display module 140, a fingerprint sensor 161-1 may obtain input fingerprint information as input data. The processor 110 compares the input data obtained through the fingerprint sensor 161-1 with authentication data stored in the memory 120, and executes an application depending on a comparison result. The display module 140 may display information, which is executed through logic of the application, through the display panel 141.

As another example, when a user selects a music streaming icon displayed in the display module 140, the processor 110 may obtain the user input through the input sensor 161-2, and activates a music streaming application stored in the memory 120. When a music play command is input to the music streaming application, the processor 110 activates a sound output module 163, and provides the user with sound information corresponding to the music play command.

Hereinafter, for convenience of illustration, the operation of the electronic device 1000 will be described in brief detail. Hereinafter, the components of the electronic device 1000 will be described in more detail. Some of the components of the electronic device 1000 described in more detail below may be integrated with each other to be provided in the form of one component, or one component of the electronic device 1000 may be provided by being separated into at least two components.

Referring to FIG. 1, the electronic device 1000 may communicate with an external electronic device 1000E over a network (e.g., a short-range wireless communication network or a long-range wireless communication network). According to an embodiment, the electronic device 1000 may include the processor 110, the memory 120, the input module 130, the display module 140, a power module (e.g., a power supply or circuit) 150, an embedded module 160, and an external module 170. According to an embodiment, the electronic device 1000 may not include at least one of the above components, or may further include at least one different component. According to an embodiment, some of the above components (e.g., the sensor module 161, an antenna module 162, or the sound output module 163) may be integrated into any other suitable component (e.g., the display module 140).

The processor 110 may execute software to control at least one component (e.g., a hardware or software component) of the electronic device 1000 connected with the processor 110, and may perform various suitable data processing or operations. According to an embodiment, as at least a part of the data processing or operations, the processor 110 may store a command or data received from a different component (e.g., the input module 130, the sensor module 161, or a communication module 173) in a volatile memory 121, may process the command or data stored in the volatile memory 121, and may store the resultant data in a non-volatile memory 122.

The processor 110 may include a main processor 111 and an auxiliary processor 112. The main processor 111 may include at least one of a central processing unit (CPU) 111-1 or an application processor (AP). The main processor 111 may further include at least one of a graphics processing unit (GPU) 111-2, a communication processor (CP), or an image signal processor (ISP). The main processor 111 may further include a neural processing unit (NPU) 111-3. The NPU may function as a processor used for processing an AI model, and the AI model may be created through machine learning. The AI model may include a plurality of artificial neural network (ANN) layers. The ANN may include a deep neural network (DNN), a convolutional neural network (CNN), a recurrent neural network (RNN), a restricted boltzman machine (RBM), a deep belief network (DBN), a bidirectional recurrent deep neural network (BRDNN), a deep Q-network, or a suitable combination of at least two of the above networks, but the present disclosure is not limited thereto. The AI model may additionally or alternatively include a software structure, in addition to a hardware structure. At least two of the above processing units and processors may be integrally implemented with one component (e.g., a single chip), or each of the above processing units and processors may be implemented with an independent component (e.g., a plurality of chips).

The auxiliary processor 112 may include a controller 112-1. The controller 112-1 may include an interface conversion circuit and a timing control circuit. The controller 112-1 receives an image signal from the main processor 111, and outputs image data obtained by converting a data format of the image signal to be suitable for a specification of an interface with the display module 140. The controller 112-1 may output various suitable kinds of control signals used to drive the display module 140.

The auxiliary processor 112 may further include a data conversion circuit 112-2, a gamma correction circuit 112-3, and a rendering circuit 112-4. The data conversion circuit 112-2 may receive image data from the controller 112-1, may compensate for the image data so that an image is displayed with a desired brightness depending on a characteristic of the electronic device 1000 or user settings, or may convert the image data to reduce a power consumption or to compensate for afterimages. The gamma correction circuit 112-3 may convert the image data or the gamma reference voltage, such that an image displayed on the electronic device 1000 has a desired gamma characteristic. The rendering circuit 112-4 may receive the image data from the controller 112-1, and may render the image data in consideration of a pixel arrangement of the display panel 141 applied to the electronic device 1000. At least one of the data conversion circuit 112-2, the gamma correction circuit 112-3, or the rendering circuit 112-4 may be integrated into any other suitable component (e.g., the main processor 111 or the controller 112-1). At least one of the data conversion circuit 112-2, the gamma correction circuit 112-3, or the rendering circuit 112-4 may be integrated into a data driver 143 described in more detail below.

The memory 120 may store various data used by at least one component (e.g., the processor 110 or the sensor module 161) of the electronic device 1000, and input data or output data for commands related thereto. The memory 120 may include at least one of the volatile memory 121 or the nonvolatile memory 122.

The input module 130 may receive a command or data to be used by a component (e.g., the processor 110, the sensor module 161, or the sound output module 163) of the electronic device 1000 from the outside of the electronic device 1000 (e.g., the user or the external electronic device 1000E).

The input module 130 may include a first input module 131 to receive a command or data from the user, and a second input module 132 to receive a command or data from the external electronic device 1000E. The first input module 131 may include a microphone, a mouse, a keyboard, a key (e.g., a button), or a pen (e.g., a passive pen or an active pen). The second input module 132 may support a protocol (e.g., a specified or predetermined protocol) capable of connecting to the external electronic device 1000E in a wired or wireless manner. According to an embodiment, the second input module 132 may include a high definition multimedia interface (HDMI), a universal serial bus (USB) interface, an SD card interface, or an audio interface. The second input module 132 may include a connector capable of being physically connected with the external electronic device 1000E, for example, an HDMI connector, a USB connector, an SD card connector, or an audio connector (e.g., a headphone connector).

The display module 140 visually provides information to the user. The display module 140 may include the display panel 141, a scan driver 142, and a data driver 143. The display module 140 may further include a window, a chassis, and a bracket for protecting the display panel 141.

The display panel 141 may include a liquid crystal display panel, an organic light emitting display panel, or an inorganic light emitting display panel, but the kind of the display panel 141 is not particularly limited thereto. The display panel 141 may be of a rigid kind, or may be of a flexible kind capable of being rolled or folded. The display module 140 may further include a supporter for supporting the display panel 141, a bracket, or a heat radiation member.

The scan driver 142 may serve as a driving chip that may be mounted in the display panel 141. In addition, the scan driver 142 may be integrated into the display panel 141. For example, the scan driver 142 may include an ASG (Amorphous Silicon) TFT gate driver circuit, an LTPS (Low Temperature Polycrystalline Silicon) TFT gate driver circuit, or an OSG (Oxide Semiconductor) TFT gate driver circuit built in the display panel 141. The scan driver 142 receives a control signal from the controller 112-1, and outputs scan signals to the display panel 141 in response to the control signal.

The display panel 141 may further include a light emitting driver. The light emitting driver outputs a light emitting control signal to the display panel 141, in response to a control signal received from the controller 112-1. The light emitting driver may be formed independently of the scan driver 142, or may be integrated into the scan driver 142.

The data driver 143 receives a data control signal from the controller 112-1. After converting image data into an analog voltage (e.g., a data voltage) in response to the control signal, the data driver 143 outputs data voltages to the display panel 141.

The data driver 143 may be integrated into a different component (e.g., the controller 112-1). The functions of the interface conversion circuit and the timing control circuit of the controller 112-1 described above may be integrated into the data driver 143.

The display module 140 may further include a light emitting driver and a voltage generation circuit. The voltage generation circuit may output various suitable kinds of voltages used to drive the display panel 141.

The power module 150 supplies power to the components of the electronic device 1000. The power module 150 may include a battery that charges a power supply voltage. The battery may include a primary cell that may not be rechargeable, a secondary cell that may be rechargeable, or a fuel cell. The power module 150 may include a power management integrated circuit (PMIC). The PMIC supplies a power that is optimized or improved for each of the modules described above and modules to be described in more detail below. The power module 150 may include a wireless power transmit/receive member electrically connected to the battery. The wireless power transmit/receive member may include a plurality of antenna radiators having the form of a coil.

The electronic device 1000 may further include the embedded module 160 and the external module 170. The embedded module 160 may include the sensor module 161, the antenna module 162, and the sound output module 163. The external module 170 may include the camera module 171, a light module 172, and the communication module 173.

The sensor module 161 may sense an input made by a physical body of a user or by a pen of the first input module 131, and may generate an electrical signal or a data value corresponding to the input. The sensor module 161 may include at least one of the fingerprint sensor 161-1, the input sensor 161-2, or a digitizer 161-3.

The fingerprint sensor 161-1 may generate a data value corresponding to the user's fingerprint. The fingerprint sensor 161-1 may include one of an optical fingerprint sensor or a capacitive fingerprint sensor.

The input sensor 161-2 may generate a data value corresponding to coordinate information of the input by the user's body or the input by the pen. The input sensor 161-2 may generate a capacitance change due to the input as a data value. The input sensor 161-2 may sense the input by the passive pen, or may exchange data with the active pen.

The input sensor 161-2 may measure a biometric signal, such as blood pressure, moisture, or body fat. For example, when the user touches his/her body part to a sensor layer or a sensing panel, and does not move for a suitable time period (e.g., a specific or predetermined time period), the input sensor 161-2 may sense the biometric signal based on a change in an electric field caused by the body part, and may output the information desired by the user to the display module 140.

The digitizer 161-3 may generate a data value corresponding to coordinate information of the input by the pen. The digitizer 161-3 generates an amount of electromagnetic change by the input as a data value. The digitizer 161-3 may sense the input by the passive pen, or may exchange data with the active pen.

At least one of the fingerprint sensor 161-1, the input sensor 161-2, or the digitizer 161-3 may be implemented with a sensor layer formed on a display layer of the display panel 141 through a subsequent process. The fingerprint sensor 161-1, the input sensor 161-2, and the digitizer 161-3 may be embedded in the display panel 141. The fingerprint sensor 161-1, the input sensor 161-2, and the digitizer 161-3 may be disposed above/on the display layer, and any one of the fingerprint sensor 161-1, the input sensor 161-2, or the digitizer 161-3, for example, such as the digitizer 161-3, may be disposed below/under the display layer.

At least two of the fingerprint sensor 161-1, the input sensor 161-2, or the digitizer 161-3 may be integrally formed with one sensing panel through the same or substantially the same process as each other. When they are integrally formed with one sensing panel, the sensing panel may be disposed between the display panel 141 and the window disposed above/on the display panel 141. According to an embodiment, the sensing panel may be disposed on the window, but the position of the sensing panel is not specifically limited thereto.

At least one of the fingerprint sensor 161-1, the input sensor 161-2, or the digitizer 161-3 may be embedded in the display panel 141. In other words, at least one of the fingerprint sensor 161-1, the input sensor 161-2, or the digitizer 161-3 may be concurrently (e.g., simultaneously or substantially simultaneously) formed with each other through a process of forming the elements (e.g., a light emitting element and transistors) included in the display panel 141.

In addition, the sensor module 161 may generate an electrical signal or a data value corresponding to an internal state or an external state of the electronic device 1000. The sensor module 161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 162 may include at least one antenna to transmit a signal or power to the outside, or to receive a signal or power from the outside. According to an embodiment, through an antenna suitable for a communication method, the communication module 173 may transmit a signal to an external electronic device, or may receive a signal from the external electronic device. An antenna pattern of the antenna module 162 may be integrated with one component (e.g., the display panel 141) of the display module 140 or the input sensor 161-2.

The sound output module 163, which is a device to output a sound signal out of the electronic device 1000, may include a speaker used for a suitable purpose, such as reproducing multimedia or a record, and a receiver dedicated to receive a telecommunication. According to an embodiment, the receiver may be formed integrally with the speaker, or may be formed separately from the speaker. A sound output pattern of the sound output module 163 may be integrated with the display module 140.

The camera module 171 may capture a still image and/or a moving picture. According to an embodiment, the camera module 171 may include at least one lens, an image sensor, or an image signal processor. The camera module 171 may further include an infrared camera capable of measuring a presence or an absence of the user, a position of the user, and a line of sight of the user.

The light module 172 may provide light. The light module 172 may include a light emitting diode or a xenon lamp. The light module 172 may operate in link to the camera module 171, or independently from the camera module 171.

The communication module 173 may establish a wired or wireless communication channel between the electronic device 1000 and the external device 1000E, and may support communication through the established communication channel. The communication module 173 may include any one of a wireless communication module, such as a cellular communication module, a short-range wireless communication module, or a global navigation satellite system (GNSS) communication module, and a wired communication module, such as a local region network (LAN) communication module or a power line communication module. In some embodiments, the communication module 173 may include all of them. The communication module 173 may communicate with the external electronic device 1000E over a short-range communication network, such as Bluetooth, Wi-Fi direct, or infrared data association (IrDA), or over a long-range communication network, such as a cellular network, the Internet, or a computer network (e.g., a LAN or a WAN). The above-described various kinds of communication modules 173 may be implemented in the form of a single chip, or in individual chips.

The input module 130, the sensor module 161, and the camera module 171 may link with the processor 110 while controlling an operation of the display module 140.

The processor 110 outputs commands or data to the display module 140, the sound output module 163, the camera module 171, or the light module 172, based on the input data received from the input module 130. For example, the processor 110 may generate the image data corresponding to the input data applied through the mouse or the active pen, and may output the image data to the display module 140. As another example, the processor 610 may generate command data corresponding to the input data, and may output the command data to the camera module 171 or the light module 172. When input data is not received from the input module 130 for a suitable time period (e.g., a specific or predetermined time period), the processor 110 may switch an operating mode of the electronic device 1000 to a low-power mode or a sleep mode, such that the power consumption of the electronic device 1000 may be reduced.

The processor 110 outputs commands or data to the display module 140, the sound output module 163, the camera module 171, or the light module 172, based on the sensing data received from the sensor module 161. For example, the processor 110 compares authentication data obtained through the fingerprint sensor 161-1 with authentication data stored in the memory 120, and executes an application depending on a comparison result. The processor 110 may execute a command based on the sensing data sensed by the input sensor 161-2 or the digitizer 161-3, or may output image data corresponding to the sensing data to the display module 140. When the sensor module 161 includes a temperature sensor, the processor 110 may receive temperature data associated with a measured temperature from the sensor module 161, and may further perform a brightness correction on the image data based on the temperature data.

The processor 110 may receive measurement data about a presence or an absence of the user, the location of the user, and the line of sight of the user, from the camera module 171. The processor 110 may further perform the brightness correction on the image data based on the measurement data. For example, the processor 110 may determine the presence or the absence of the user through the input from the camera module 171, and may display, to the display module 140, image data brightness corrected through the data conversion circuit 112-2 or the gamma correction circuit 112-3.

Some of the above described components may be connected with each other through a communication scheme between peripheral devices, for example, such as a bus, a general purpose input/output (GPIO), a serial peripheral interface (SPI), a mobile industry processor interface (MIPI), or a ultra-path interconnect (UPI) link, and may exchange signals (e.g., commands or data) with each other. The processor 110 may communicate with the display module 140 through a suitable interface (e.g., a specific or predetermined interface). For example, one of the communication methods described above may be used, but the present disclosure is not limited thereto.

The electronic device 1000 according to various embodiments of the present disclosure may be implemented as various suitable kinds of electronic devices. The electronic device 1000 may include, or may be implemented as, for example, at least one of a portable communication device (e.g., a smartphone), a computer device, a portable multimedia device, a portable medical device, a camera, a wearable device, or a home appliance. However, the present disclosure is not limited thereto, and the electronic device 1000 is not limited to the above-described devices.

Figure 2:
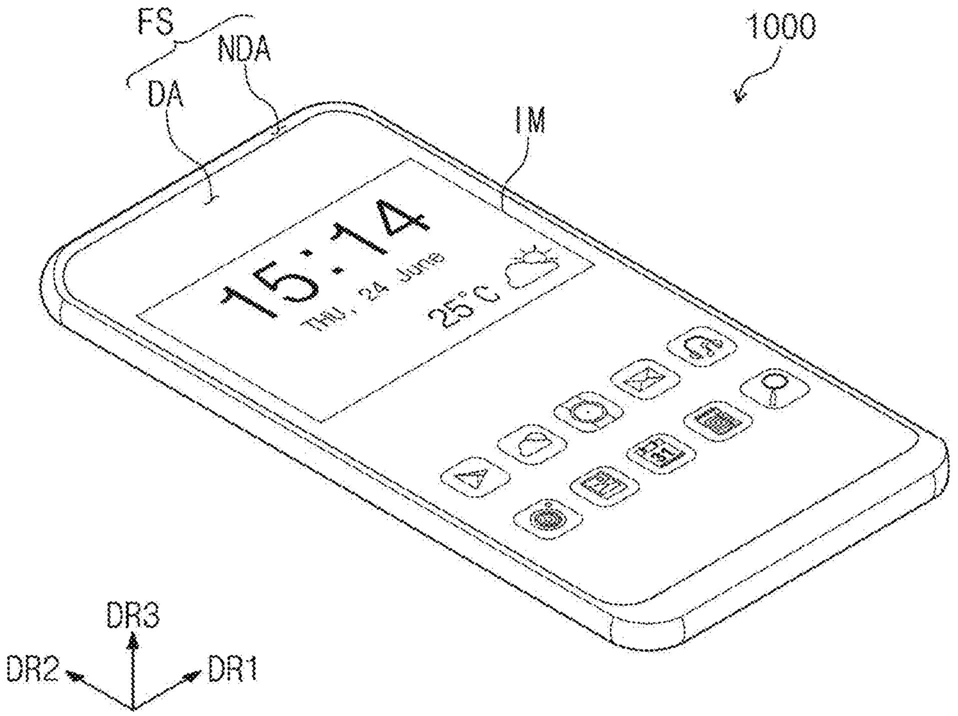
FIG. 2 is a perspective view of an electronic device according to an embodiment of the present disclosure.

FIG. 2 is a perspective view of an electronic device according to an embodiment of the present disclosure.

Referring to FIG. 2, the electronic device 1000 may be a device that is activated by an electrical signal. For example, the electronic device 1000 may be a cellular phone, a foldable phone, a laptop computer, a television, a tablet, a vehicle navigation system, a game console, or a wearable device, but the present disclosure is not limited thereto. FIG. 2 illustrates that the electronic device 1000 is a cellular phone by way of example.

The electronic device 1000 may include a display surface FS defined to be parallel to or substantially parallel to a first direction DR1 and a second direction DR2 crossing the first direction DR1. The display surface FS may include an active region DA and a peripheral region NDA. The electronic device 1000 may display an image IM through the active region DA. The peripheral region NDA may surround (e.g., around a periphery of) the active region DA.

The thickness direction of the electronic device 1000 may be parallel to or substantially parallel to a third direction DR3 crossing the first direction DR1 and the second direction DR2. Accordingly, a front surface (e.g., a top surface) and a rear surface (e.g., a back surface) of the members constituting the electronic device 1000 may be defined based on the third direction DR3.

Figure 3:
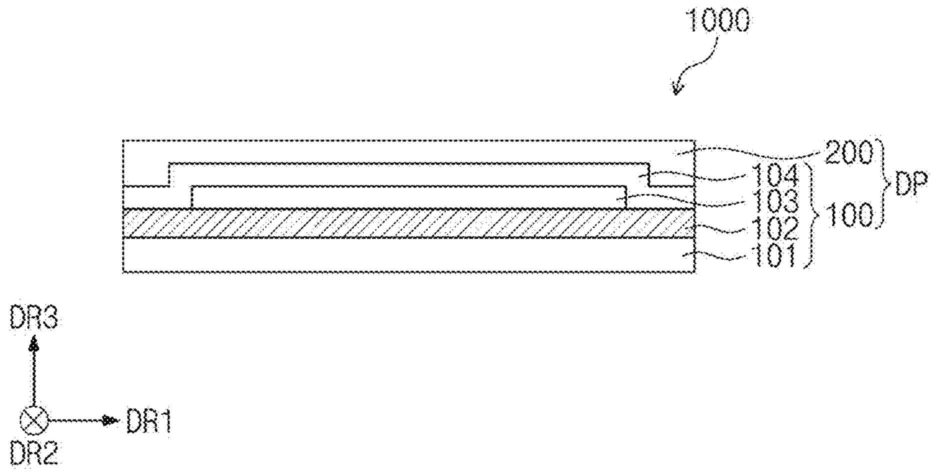
FIG. 3 is a schematic cross-sectional view of an electronic device according to an embodiment of the present disclosure.

FIG. 3 is a schematic cross-sectional view of an electronic device according to an embodiment of the present disclosure.

Referring to FIG. 3, the electronic device 1000 may include a display panel DP. The display panel DP may be a component that is the same or substantially the same as the display panel 141 described above with reference to FIG. 1. The display panel DP may include a display layer 100 and a sensor layer 200.

The display layer 100 may be a component that substantially generates the image IM (e.g., see FIG. 2). The display layer 100 may be an emissive display layer, but the present disclosure is not limited thereto. For example, the display layer 100 may be an organic light emitting layer, a quantum-dot display layer, a micro-LED display layer, or a nano-LED display layer. The light emitting layer of the organic light emitting layer may include an organic light emitting material. The light emitting layer of the quantum dot light emitting display layer may include a quantum dot or a quantum rod. A light emitting layer of the micro-LED display layer may include a micro-LED. A light emitting layer of the nano-LED display layer may include a nano-LED.

The display layer 100 may include a base layer 101, a circuit layer 102, the light emitting element layer 103, and an encapsulating layer 104.

The base layer 101 may be a member that provides a base surface for disposing the circuit layer 102. The base layer 101 may be of a multi-layered structure or a single-layer structure. The base layer 101 may be implemented with a glass substrate, a metal substrate, a silicon substrate, or a polymer substrate, but the present disclosure is not limited thereto.

The circuit layer 102 may be disposed on the base layer 101. The circuit layer 102 may include an insulating layer, a semiconductor pattern, a conductive pattern, and a signal line. An insulating layer, a semiconductor layer, and a conductive layer may be formed on the base layer 101 through a coating or deposition process, and the insulating layer, the semiconductor layer, and the conductive layer may then be selectively patterned through a plurality of photolithography processes.

The light emitting element layer 103 may be disposed on the circuit layer 102. The light emitting element layer 103 may include a light emitting element. For example, the light emitting element layer 103 may include an organic light emitting material, an inorganic light emitting material, an organic-inorganic light emitting material, a quantum dot, a quantum rod, a micro-LED, or a nano-LED.

The encapsulating layer 104 may be disposed on the light emitting element layer 103. The encapsulating layer 104 may protect the light emitting element layer 103 from foreign substances, such as moisture, oxygen, and dust particles.

The sensor layer 200 may be disposed on the display layer 100. The sensor layer 200 may sense an external input applied from the outside. The sensor layer 200 may be an integral-kind of sensor formed subsequently to the display layer 100 in the manufacturing process of the display layer 100, or may be an external sensor that is attached to the display layer 100. The sensor layer 200 may be referred to as a "sensor", an "input sensing layer", an "input sensing panel", or an "electronic device dedicated to sense input coordinates".

According to an embodiment of the present disclosure, the sensor layer 200 may sense both an input to a passive kind of input unit, such as a user's body, and an input into an input device generating a magnetic field of a suitable resonant frequency (e.g., a specific or predetermined resonant frequency).

Figure 4:
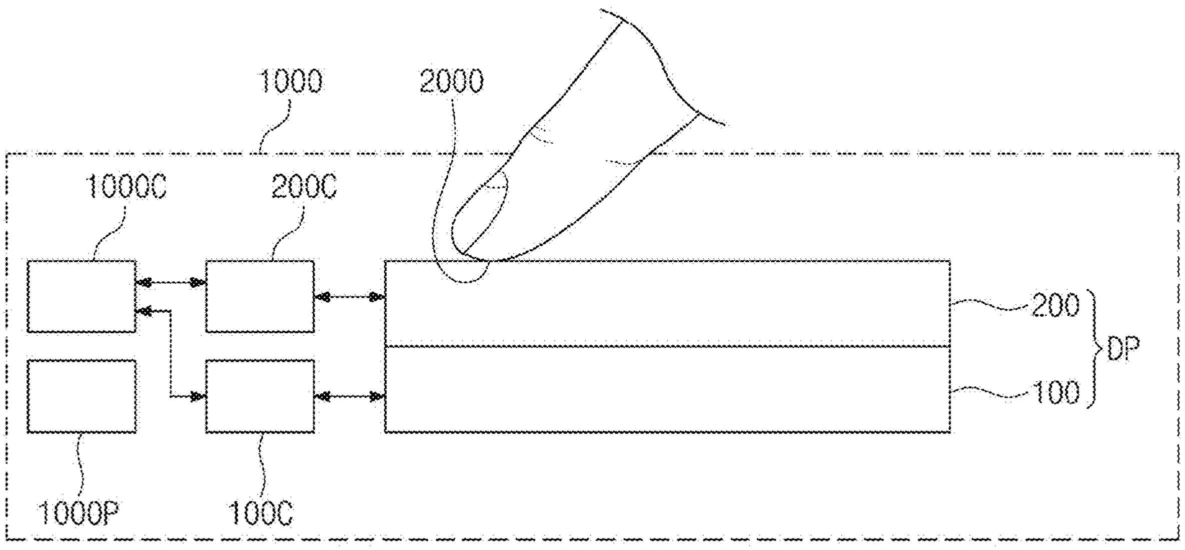
FIG. 4 is a block diagram schematically illustrating an operation of an electronic device according to an embodiment of the present disclosure.

FIG. 4 is a block diagram schematically illustrating an operation of an electronic device according to an embodiment of the present disclosure.

Referring to FIG. 4, the electronic device 1000 may include the display panel DP, a display driver 100C, a sensor driver 200C, a main driver 1000C, and a power supply circuit 1000P.

The sensor layer 200 may sense a first input 2000 applied thereto from the outside. The first input 2000 may be an input unit to provide a change in a capacitance of the sensor layer 200. For example, the first input 2000 may be the passive kind of input unit, such as a user's body.

The main driver 1000C may control the overall operations of the electronic device 1000. For example, the main driver 1000C may control the operations of the display driver 100C and the sensor driver 200C. The main driver 1000C may include at least one microprocessor, and may further include a graphics controller. The main driver 1000C may be referred to as an application processor, a central processing unit, or a main processor. The main driver 1000C may be a component corresponding to the processor 110 described above with reference to FIG. 1.

The display driver 100C may control the display layer 100. The display driver 100C may receive image data and a control signal from the main driver 1000C. The control signal may include various suitable signals. For example, the control signal may include an input vertical synchronization signal, an input horizontal synchronization signal, a main clock, and a data enable signal.

The sensor driver 200C may drive the sensor layer 200. The sensor driver 200C may receive a control signal from the main driver 1000C. The control signal may include a clock signal of the sensor driver 200C. In addition, the control signal may further include a mode determining signal for determining a driving mode of the sensor driver 200C and the sensor layer 200.

The sensor driver 200C may be implemented in the form of an integrated circuit (IC), and may be electrically connected to the sensor layer 200. For example, the sensor driver 200C may be directly mounted on a suitable region (e.g., a specific or predetermined region) of the display panel, or may be mounted through a chip on film (COF) scheme on a separate printed circuit board, such that the sensor driver 200C may be electrically connected to the sensor layer 200.

The sensor driver 200C may calculate information on the coordinates of the input based on a signal received from the sensor layer 200, and may provide a coordinate signal having the coordinate information to the main driver 1000C. The main driver 1000C executes an operation corresponding to the user input in response to the coordinate signal. For example, the main driver 1000C may operate the display driver 100C, such that a new application image is displayed on the display layer 100.

The power supply circuit 1000P may include a power management integrated circuit (PMIC). The power supply circuit 1000P may generate a plurality of driving voltages to drive the display layer 100, the sensor layer 200, the display driver 100C, and the sensor driver 200C. For example, the plurality of driving voltages may include a high gate voltage, a low gate voltage, a first driving voltage (e.g., an ELVSS voltage), a second driving voltage (e.g., an ELVDD voltage), or an initializing voltage, but the present disclosure is not limited thereto. The power supply circuit 1000P may be included in the power module 150 illustrated in FIG. 1.

Figure 5:
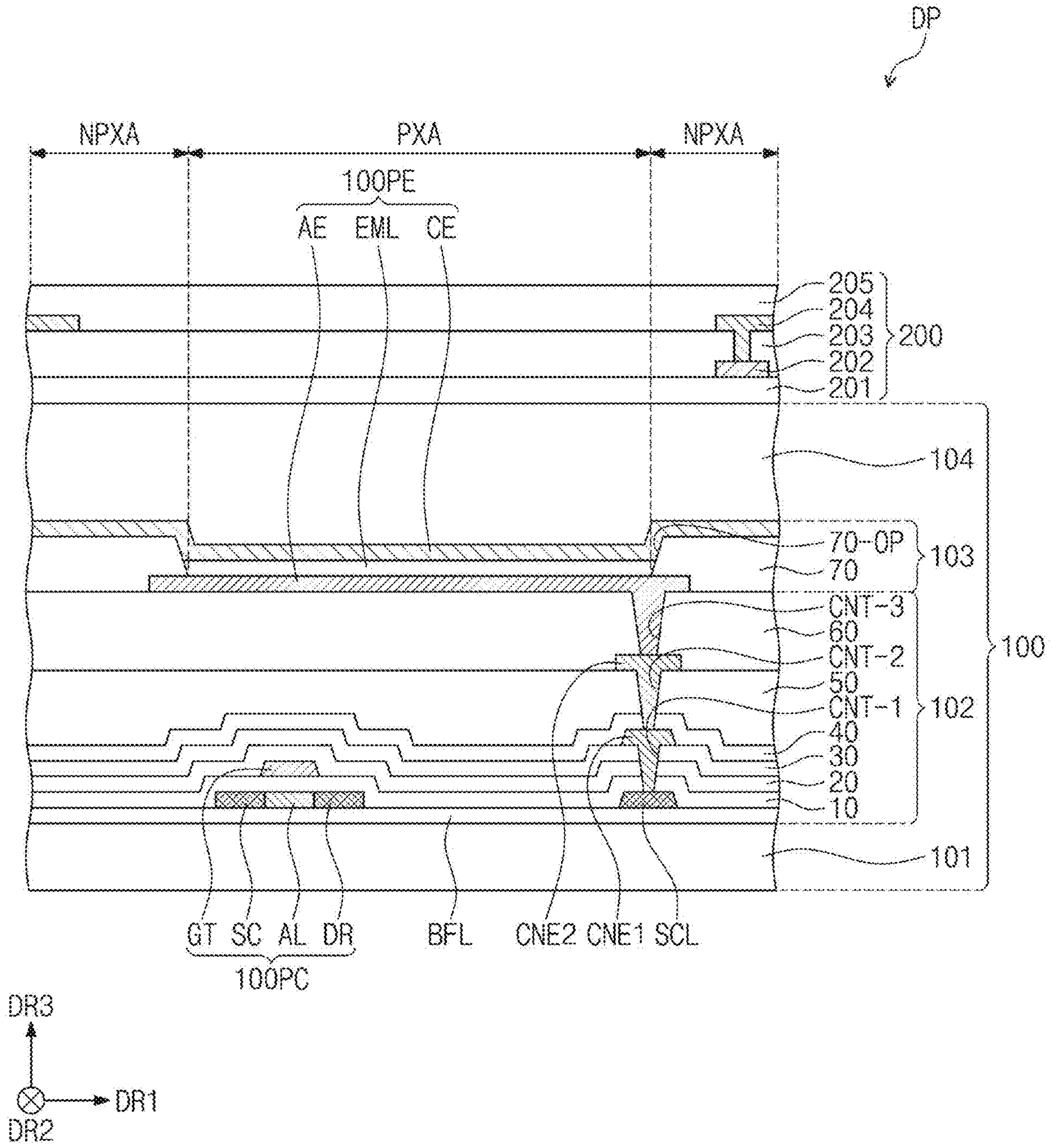
FIG. 5 is a cross-sectional view illustrating a display panel according to an embodiment of the present disclosure.

FIG. 5 is a cross-sectional view illustrating a display panel according to an embodiment of the present disclosure. In FIG. 5, the same reference numerals are assigned to the same or substantially the same components as those described above with reference to FIG. 3, and thus, redundant description thereof may not be repeated.

Referring to FIG. 5, at least one buffer layer BFL may be formed on a top surface of the base layer 101. The buffer layer BFL may improve a bonding force between the base layer 101 and the semiconductor pattern. The buffer layer BFL may be formed in a multi-layered structure. As another example, the display layer 100 may further include a barrier layer. The buffer layer BFL may include at least one of a silicon oxide, a silicon nitride, or a silicon oxynitride. For example, the buffer layer BFL may include a structure in which a silicon oxide layer and a silicon nitride layer are stacked alternately.

Semiconductor patterns SC, AL, DR, and SCL may be disposed on the buffer layer BFL. The semiconductor patterns SC, AL, DR, and SCL may include polysilicon. However, the present disclosure is not limited thereto. For example, the semiconductor patterns SC, AL, DR, and SCL may include amorphous silicon, a low-temperature polycrystalline silicon, or an oxide semiconductor.

FIG. 5 shows a portion (e.g., only a portion) of the semiconductor pattern (SC, AL, DR, and SCL), and the semiconductor pattern (SC, AL, DR, and SCL) may be further disposed in any other suitable region. The semiconductor patterns (SC, AL, DR, and SCL) may be arranged across the pixels in compliance with a suitable rule (e.g., a specific or predetermined rule). The electrical property of the semiconductor pattern (SC, AL, DR, and SCL) may be varied depending on a doping state. The semiconductor pattern (SC, AL, DR, and SCL) may include a first region (SC, DR, and SCL) having a higher conductivity, and a second region (AL) having a lower conductivity. The first region (SC, DR, and SCL) may be doped with an N-type dopant or a P-type dopant. A P-type transistor may include a region doped with the P-type dopant, and an N-type transistor may include a region doped with the N-type dopant. The second region AL may be a non-doping region, or may be a doping region that is more lightly doped than the first region.

The conductivity of the first region (SC, DR, and SCL) may be greater than the conductivity of the second region AL, and may substantially serve as an electrode or a signal line. The second region AL may substantially correspond to an active region AL (e.g., a channel) of a transistor 100PC. In other words, a portion (AL) of the semiconductor pattern (SC, AL, DR, and SCL) may be the active region AL of the transistor 100PC, another portion (SC and DR) thereof may be a source region SC or a drain region DR of the transistor 100PC, and another portion (SCL) of the semiconductor pattern (SC, AL, DR, and SCL) may be a connecting electrode or a connecting signal line SCL.

Each pixel may have an equivalent circuit including seven transistors, one capacitor, and a light emitting element, but the equivalent circuit of the pixel may be variously modified in various suitable forms. FIG. 5 illustrates one transistor 100PC and a light emitting element 100PE included in a pixel.

The source region SC, the active region AL, and the drain region DR of the transistor 100PC may be formed from the semiconductor pattern (SC, AL, DR, and SCL). The source region SC and the drain region DR may extend in directions opposite to each other from the active region AL, when viewed in a cross-sectional view. A portion of the connecting signal line SCL formed from the semiconductor pattern (SC, AL, DR, and SCL) is illustrated in FIG. 5. In another view, the connecting signal line SCL may be connected to the drain region DR of the transistor 100PC (e.g., in a plan view).

A first insulating layer 10 may be disposed on the buffer layer BFL. The first insulating layer 10 may overlap with (e.g., may be overlapped by) a plurality of pixels in common to cover the semiconductor pattern (SC, AL, DR, and SCL). The first insulating layer 10 may be an inorganic layer and/or an organic layer, and may have a single-layer or multi-layered structure. The first insulating layer 10 may include at least one of an aluminum oxide, a titanium oxide, a silicon oxide, a silicon nitride, a silicon oxynitride, a zirconium oxide, or a hafnium oxide. According to an embodiment, the first insulating layer 10 may be a silicon oxide layer of a single layer. In addition to the first insulating layer 10, an insulating layer of the circuit layer 102 described in more detail below may be an inorganic layer and/or an organic layer, and may have a single-layer or multi-layered structure. The inorganic layer may include at least one of the above-described inorganic materials, but the present disclosure is not limited thereto.

A gate GT of the transistor 100PC is disposed on the first insulating layer 10. The gate GT may be a portion of a metal pattern. The gate GT may overlap with the active region AL. The gate GT may function as a mask in the process of doping or reducing the semiconductor pattern (SC, AL, DR, and SCL).

A second insulating layer 20 may be disposed on the first insulating layer 10 to cover the gate GT. The second insulating layer 20 may overlap with (e.g., may be overlapped by) the pixels in common. The second insulating layer 20 may be an inorganic layer and/or an organic layer, and may have a single-layer or multi-layered structure. The second insulating layer 20 may include at least one of a silicon oxide, a silicon nitride, or a silicon oxynitride. According to an embodiment, the second insulating layer 20 may have a multi-layered structure including a silicon oxide layer and a silicon nitride layer.

A third insulating layer 30 may be disposed on the second insulating layer 20. The third insulating layer 30 may have a single-layer or multi-layered structure. According to an embodiment, the third insulating layer 30 may have a multi-layered structure including a silicon oxide layer and a silicon nitride layer.

A first connecting electrode CNE1 may be disposed on the third insulating layer 30. The first connecting electrode CNE1 may be connected to the connecting signal line SCL through a contact hole CNT-1 formed through (e.g., penetrating) the first, second, and third insulating layers 10, 20, and 30.

A fourth insulating layer 40 may be disposed on the third insulating layer 30. The fourth insulating layer 40 may be a silicon oxide layer of a single layer. A fifth insulating layer 50 may be disposed on the fourth insulating layer 40. The fifth insulating layer 50 may be an organic layer.

A second connecting electrode CNE2 may be disposed on the fifth insulating layer 50. The second connecting electrode CNE2 may be connected to the first connecting electrode CNE1 through a contact hole CNT-2 formed through (e.g., penetrating) the fourth insulating layer 40 and the fifth insulating layer 50.

A sixth insulating layer 60 may be disposed on the fifth insulating layer 50, and may cover the second connecting electrode CNE2. The sixth insulating layer 60 may be an organic layer.

The light emitting element layer 103 may be disposed on the circuit layer 102. The light emitting element layer 103 may include the light emitting element 100PE. For example, the light emitting element layer 103 may include an organic light emitting material, an inorganic light emitting material, an organic-inorganic light emitting material, a quantum dot, a quantum rod, a micro-LED, or a nano-LED. Hereinafter, for convenience of illustration, the light emitting element 100PE may be described in more detail in the context of an organic light emitting element, by way of example, but the present disclosure is not specifically limited thereto.

The light emitting element 100PE may include an anode electrode AE, a light emitting layer EML, and a cathode electrode CE.

The anode electrode AE may be disposed on the sixth insulating layer 60. The anode electrode AE may be connected to the second connecting electrode CNE2 through a contact hole CNT-3 formed through (e.g., penetrating) the sixth insulating layer 60.

A pixel defining layer 70 may be disposed on the sixth insulating layer 60, and may cover a portion of the anode electrode AE. An opening 70-OP is defined in the pixel defining layer 70. The opening 70-OP of the pixel defining layer 70 exposes at least a portion of the anode electrode AE.

The active region DA (e.g., see FIG. 2) may include a light emitting region PXA, and a non-light emitting region NPXA adjacent to the light emitting region PXA. The non-light emitting region NPXA may surround (e.g., around a periphery of) the light emitting region PXA. According to an embodiment, the light emitting region PXA is defined to correspond to a partial region of the anode electrode AE exposed through the opening 70-OP.

The light emitting layer EML may be disposed on the anode electrode AE. The light emitting layer EML may be disposed in the region corresponding to the opening 70-OP. In other words, the light emitting layer EML may be separately formed for each pixel. When the light emitting layer EL is separately formed for each pixel, each of the light emitting layers EL may emit light of at least one of a blue color, a red color, or a green color. However, the present disclosure is not limited thereto. For example, the light emitting layer EML may be connected to the pixels in common. In this case, the light emitting layer EML may provide a blue light, or may provide a white light.

The cathode electrode CE may be disposed on the light emitting layer EML. The cathode electrode CE may have an integrated shape, and may be included in a plurality of pixels in common.

According to an embodiment of the present disclosure, a hole control layer may be interposed between the anode electrode AE and the light emitting layer EML. The hole control layer may be disposed in common in the light emitting region PXA and the non-light emitting region NPXA. The hole control layer may include a hole transport layer, and may further include a hole injection layer. An electron control layer may be disposed between the light emitting layer EML and the cathode electrode CE. The electron control layer may include an electron transport layer, and may further include an electron injection layer. The hole control layer and the electron control layer may be formed in the plurality of pixels in common by using an open mask or an ink-jet process.

The encapsulating layer 104 may be disposed on the light emitting element layer 103. The encapsulating layer 104 may include an inorganic layer, an organic layer, and an inorganic layer, which may be sequentially stacked, but the layers constituting the encapsulating layer 104 are not limited thereto. The inorganic layers may protect the light emitting element layer 103 from moisture and oxygen, and the organic layer may protect the light-emitting element layer 103 from a foreign material, such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but the present disclosure is not limited thereto.

The sensor layer 200 may include a base layer 201, a first conductive layer 202, a sensing insulating layer 203, a second conductive layer 204, and a cover insulating layer 205.

The base layer 201 may be an inorganic layer including at least one of silicon nitride, silicon oxynitride, or silicon oxide. As another example, the base layer 201 may be an organic layer including an epoxy resin, an acrylic resin, or an imide-based resin. The base layer 201 may have a single-layer structure, or a multi-layered structure including a plurality of layers stacked in the third direction DR3.

Each of the first conductive layer 202 and the second conductive layer 204 may have a single-layer structure, or a multi-layered structure including the layers stacked in the third direction DR3.

Each of the first conductive layer 202 and the second conductive layer 204 having the single layer structure may include a metal layer or a transparent conductive layer. As used herein, the phrase a "transparent ~" may refer to a transmittance of light that is equal to or greater than a reference (e.g., a specific or predetermined reference). For example, the reference may be 90%, but the present disclosure is not limited thereto. The metal layer may include molybdenum, silver, titanium, copper, aluminum, or a suitable alloy thereof. The transparent conductive layer may include a transparent conductive oxide, such as indium tin oxide (ITO), indium zinc oxide (IZO), zinc oxide (ZnO), or indium zinc tin oxide (IZTO). In addition, the transparent conductive layer may include a conductive polymer such as poly(3,4-ethylenedioxythiophene) (PEDOT), a metal nanowire, or graphene.

Each of the first conductive layer 202 and the second conductive layer 204 having the multi-layered structure may include a plurality of metal layers. The metal layers may have, for example, a three-layered structure of titanium/aluminum/titanium. The conductive layer in the multi-layered structure may include at least one metal layer and at least one transparent conductive layer.

At least one of the sensing insulating layer 203 or the cover insulating layer 205 may include an inorganic layer. The inorganic layer may include at least one of an aluminum oxide, a titanium oxide, a silicon oxide, a silicon nitride, a silicon oxynitride, a zirconium oxide, or a hafnium oxide.

At least one of the sensing insulating layer 203 or the cover insulating layer 205 may include an organic layer. The organic layer may include at least one of an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

Figure 6:
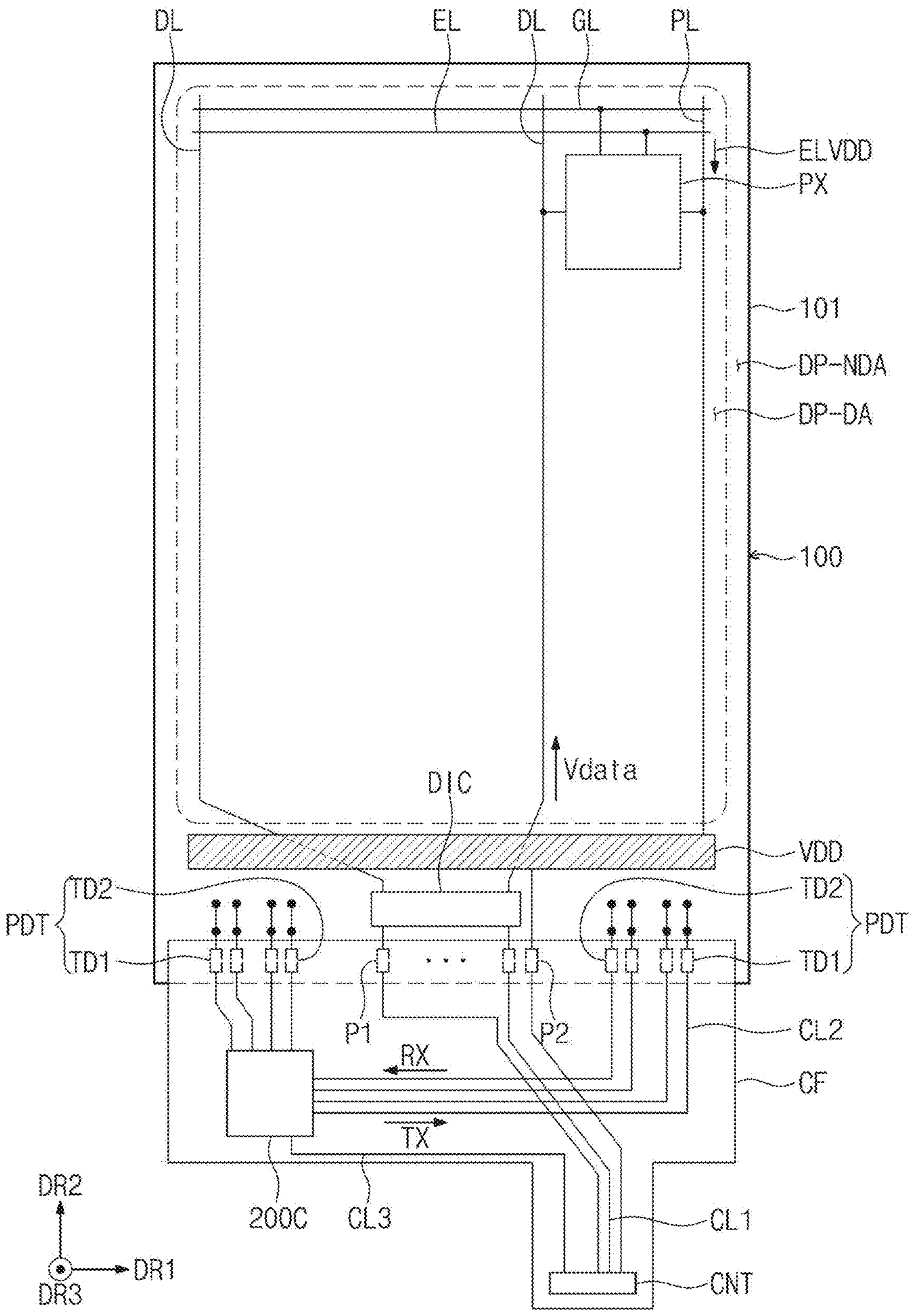
FIG. 6 is a plan view schematically illustrating a display layer and a circuit board according to an embodiment of the present disclosure.

FIG. 6 is a plan view schematically illustrating a display layer and a circuit board according to an embodiment of the present disclosure.

Referring to FIG. 6, the electronic device 1000 (e.g., see FIG. 3) may include the display layer 100, a power pattern VDD, a data driver DIC, a circuit board CF, the sensor driver 200C, and a connector CNT.

A display region DP-DA and a peripheral region DP-NDA adjacent to the display region DP-DA may be defined in the display layer 100. The display region DP-DA may be a region for displaying an image. The display region DP-DA may include a plurality of pixels PX disposed therein. The peripheral region DP-NDA may be a region for disposing a driving circuit or a driving wire.

The display layer 100 may include the base layer 101, the plurality of pixels PX, a plurality of signal lines GL, DL, PL, and EL, a plurality of display pads P1 and P2, and a plurality of sensing pads PDT.

Each of the plurality of pixels PX may display one of the primary colors, or one of mixed colors. The primary colors may include red, green, and blue. The mixed colors may include various suitable colors, such as white, yellow, cyan, or magenta. However, the color displayed by each of the pixels PX is not limited thereto.

The plurality of signal lines GL, DL, PL, and EL may be disposed on the base layer 101. The plurality of signal lines GL, DL, PL, and EL may be connected to the plurality of pixels PX to transmit an electrical signal to the plurality of pixels PX. The plurality of signal lines GL, DL, PL, and EL may include a plurality of scan lines GL, a plurality of data lines DL, a plurality of power lines PL, and a plurality of light emitting control lines EL. However, the present disclosure is not limited thereto. For example, the configuration of the plurality of signal lines GL, DL, PL, and EL is not limited thereto. For example, the plurality of signal lines GL, DL, PL, and EL according to an embodiment of the present disclosure may further include an initializing voltage line.

The power pattern VDD may be disposed in the peripheral region DP-NDA. The power pattern VDD may be connected to the plurality of power lines PL. Each of the plurality of pixels PX may receive a second driving voltage ELVDD provided through a corresponding power line PL.

The plurality of display pads P1 and P2 may be disposed in the peripheral region DP-NDA. The plurality of display pads P1 and P2 may include a first pad P1 and a second pad P2. The first pad P1 may include a plurality of first pads P1. The plurality of first pads P1 may be connected to the plurality of data lines DL, respectively. The second pad P2 may be connected to the power pattern VDD to be electrically connected to the plurality of power lines PL. The display layer 100 may provide electrical signals, which are provided from the outside through the plurality of display pads P1 and P2, to the plurality of pixels PX. The plurality of display pads P1 and P2 may further include pads that are used to receive different electrical signals, in addition to the first pad P1 and the second pad P2, but the present disclosure is not particularly limited thereto.

The data driver DIC may be mounted in the peripheral region DP-NDA. The data driver DIC may be a chip-kind of timing control circuit. The data driver DIC may output a data signal Vdata to the plurality of data lines DL in response to frame data of image data. The data signal Vdata may be a grayscale voltage corresponding to the image data.

The plurality of data lines DL may be electrically connected to the plurality of first pads P1 through the data driver DIC, respectively. However, the present disclosure is not limited thereto. The data driver DIC according to an embodiment of the present disclosure may be mounted on a film different from the display layer 100. The data driver DIC may be electrically connected to the plurality of display pads P1 and P2 through the film. The data driver DIC may be included in the display driver 100C (e.g., see FIG. 4). The data driver DIC may be a component that is the same or substantially the same as the data driver 143 illustrated in FIG. 1.

The plurality of sensing pads PDT may be disposed in the peripheral region DP-NDA. The plurality of sensing pads PDT may be electrically connected to the plurality of sensing electrodes of the sensor layer 200. The plurality of sensing pads PDT may include a plurality of first sensing pads TD1 and a plurality of second sensing pads TD2.

The circuit board CF may be electrically connected to the plurality of display pads P1 and P2 and the plurality of sensing pads PDT.

The sensor driver 200C may be mounted on the circuit board CF. The sensor driver 200C may be electrically connected to the plurality of sensing pads PDT. The sensor driver 200C may drive the sensor layer 200 (e.g., see FIG. 4).

The first connecting line CL1 may be electrically connected to the data driver DIC. For example, the first connecting line CL1 may be connected between the plurality of display pads P1 and P2 and the connector CNT. The first connecting line CL1 may be disposed on the circuit board CF.

A second connecting line CL2 may be electrically connected between the sensor layer 200 and the sensor driver 200C. For example, the second connecting line CL2 may be connected between the plurality of sensing pads PDT and the sensor driver 200C. A sensing signal TX and a receive signal RX may be provided through the second connecting line CL2. The second connecting line CL2 may be disposed on the circuit board CF.

A third connecting line CL3 may be electrically connected between the sensor driver 200C and the connector CNT.

The connector CNT may be connected to the main driver 1000C (e.g., see FIG. 4) and the power supply circuit 1000P.

Figure 7:
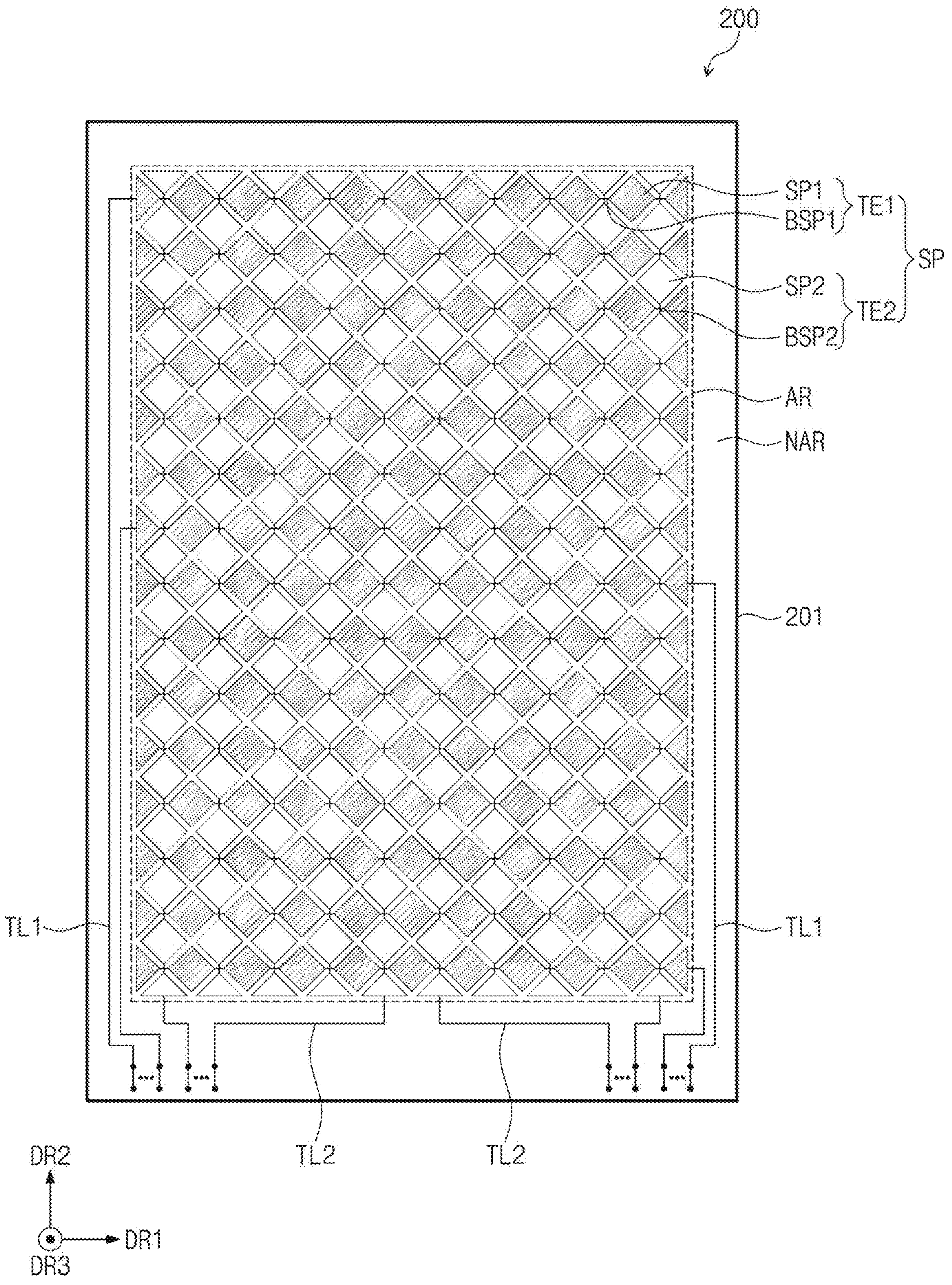
FIG. 7 is a plan view of a sensor layer according to an embodiment of the present disclosure.

FIG. 7 is a plan view of a sensor layer according to an embodiment of the present disclosure.

Referring to FIGS. 6 and 7, the sensor layer 200 may include an active region AR, and a peripheral region NAR adjacent to the active region AR. The active region AR may be a region activated in response to an electrical signal. The active region AR may be a region for sensing an input. The active region AR may overlap with the display region DP-DA of the display layer 100. The peripheral region NAR may overlap with the peripheral region DP-NDA of the display layer 100.

The sensor layer 200 may include a plurality of sensing electrodes SP, and a plurality of sensing lines TL1 and TL2. A plurality of first electrodes TE1 and a plurality of second electrodes TE2 may be disposed in the active region AR. The plurality of sensing lines TL1 and TL2 may be disposed in the peripheral region NAR.

A base layer 201 may be an inorganic layer including any one of a silicon nitride, a silicon oxynitride, or a silicon oxide. As another example, the base layer 201 may be an organic layer including an epoxy resin, an acrylic resin, or an imide-based resin. The base layer 201 may be disposed on (e.g., may be directly disposed on) the display layer 100. As another example, the base layer 201 may be bonded to the display layer 100 through an adhesive member.

The plurality of sensing electrodes SP may include the plurality of first electrodes TE1 and the plurality of second electrodes TE2. The sensor layer 200 may obtain information on an external input through a change in a capacitance between the plurality of first electrodes TE1 and the plurality of second electrodes TE2. The plurality of first electrodes TE1 and the plurality of second electrodes TE2 may be insulated from each other while crossing each other.

The plurality of first electrodes TE1 may extend in the first direction DR1, and may be arranged along second direction DR2. The plurality of first electrodes TE1 may include a plurality of sensing patterns SP1 and a plurality of bridge patterns BSP1. Each of the plurality of bridge patterns BSP1 may electrically connect two sensing patterns SP1 that are adjacent to each other. The plurality of sensing patterns SP1 may be referred to as the plurality of first sensing parts SP1. The plurality of bridge patterns BSP1 may be referred to as the plurality of first connecting parts BSP1.

The sensor driver 200C may provide a sensing signal TX to each of the plurality of first sensing lines TL1. The sensing signal TX may be sequentially output to each of the plurality of first electrodes TE1.

The plurality of second electrodes TE2 may extend in the second direction DR2, and may be arranged along the first direction DR1. The plurality of second electrodes TE2 may include a plurality of first parts SP2 and a plurality of second parts BSP2. Each of the plurality of second parts BSP2 may electrically connect two first parts SP2 that are adjacent to each other. The plurality of first parts SP2 may be referred to as the plurality of second sensing parts SP2. The plurality of second parts BSP2 may be referred to as the plurality of second connecting parts BSP2.

The plurality of bridge patterns BSP1 may be disposed at (e.g., in or on) a layer different from a layer for the plurality of second parts BSP2. The plurality of bridge patterns BSP1 may be insulated from the plurality of second electrodes TE2 while crossing the plurality of second electrodes TE2. For example, the plurality of bridge patterns BSP1 may be insulated from the plurality of second parts BSP2 while crossing the plurality of second parts BSP2.

The sensor driver 200C may receive the receive signal RX from the plurality of second electrodes TE2. The sensor driver 200C may calculate coordinate information of an input based on the receive signal RX received from the sensor layer 200, and may provide a coordinate signal having the coordinate information to the main driver 1000C. The receive signal RX may include information on a change value of a capacitance between the plurality of first electrodes TE1 and the plurality of second electrodes TE2.

The plurality of sensing lines TL1 and TL2 may include the plurality of first sensing lines TL1 and the plurality of second sensing lines TL2. The plurality of first sensing lines TL1 may be electrically connected to the plurality of first electrodes TE1, respectively. The plurality of second sensing lines TL2 may be electrically connected to the plurality of second electrodes TE2, respectively.

The plurality of first sensing lines TL1 may be electrically connected to the plurality of first sensing pads TD1 through contact holes. The plurality of second sensing lines TL2 may be electrically connected to the plurality of second sensing pads TD2 through contact holes.

Figure 8:
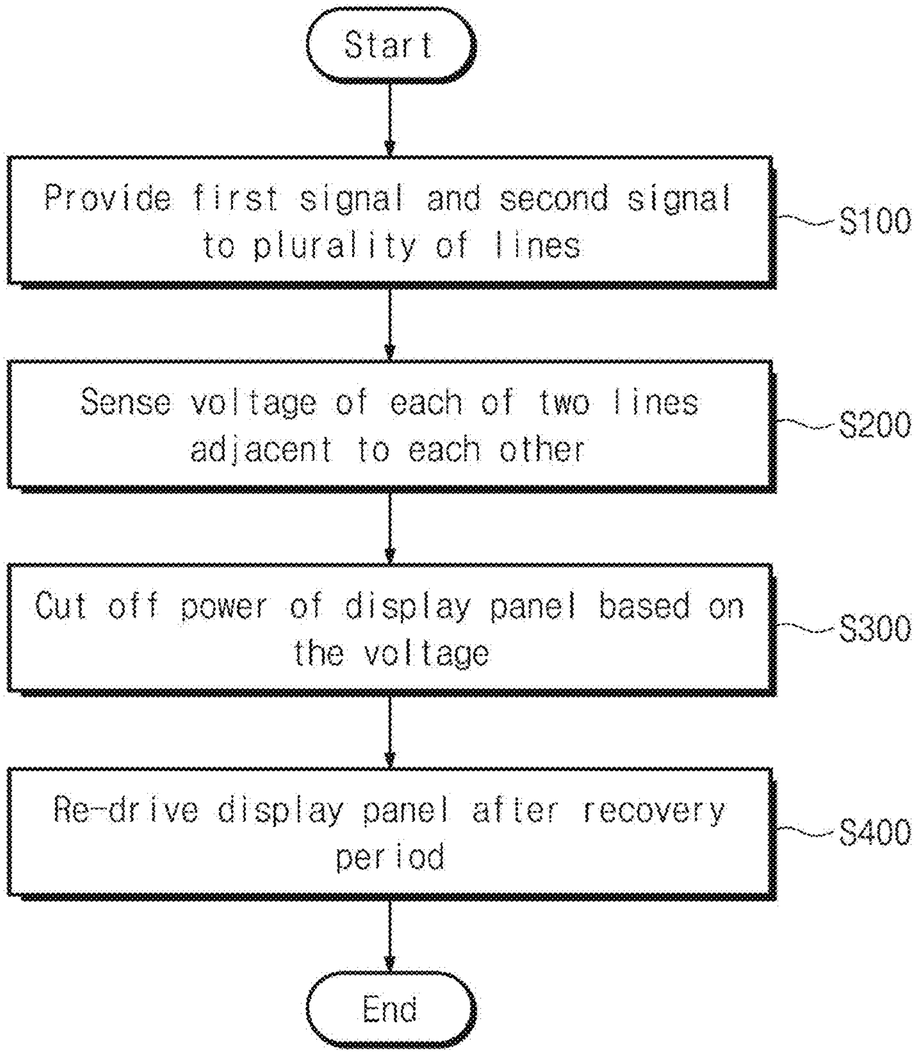
FIG. 8 is a flowchart of a method for driving an electronic device according to an embodiment of the present disclosure.

FIG. 8 is a flowchart illustrating a method for driving an electronic device according to an embodiment of the present disclosure.

Referring to FIG. 8, the method for driving the electronic device may start, and may include providing, by the driving circuit, a first signal and a second signal different from the first signal to a plurality of lines (e.g., two lines), which may be adjacent to each other (S100). The driving circuit may sense a voltage (e.g., a generated voltage) of each of two lines adjacent to each other (S200), and may cut off the power of the display panel DP based on the voltage for a recovery period (e.g., a specific or predetermined recovery period) (S300). The driving circuit may re-drive the display panel DP after the recovery period (e.g., the specific or predetermined recovery period) (S400), and the method may end.

Figure 9:
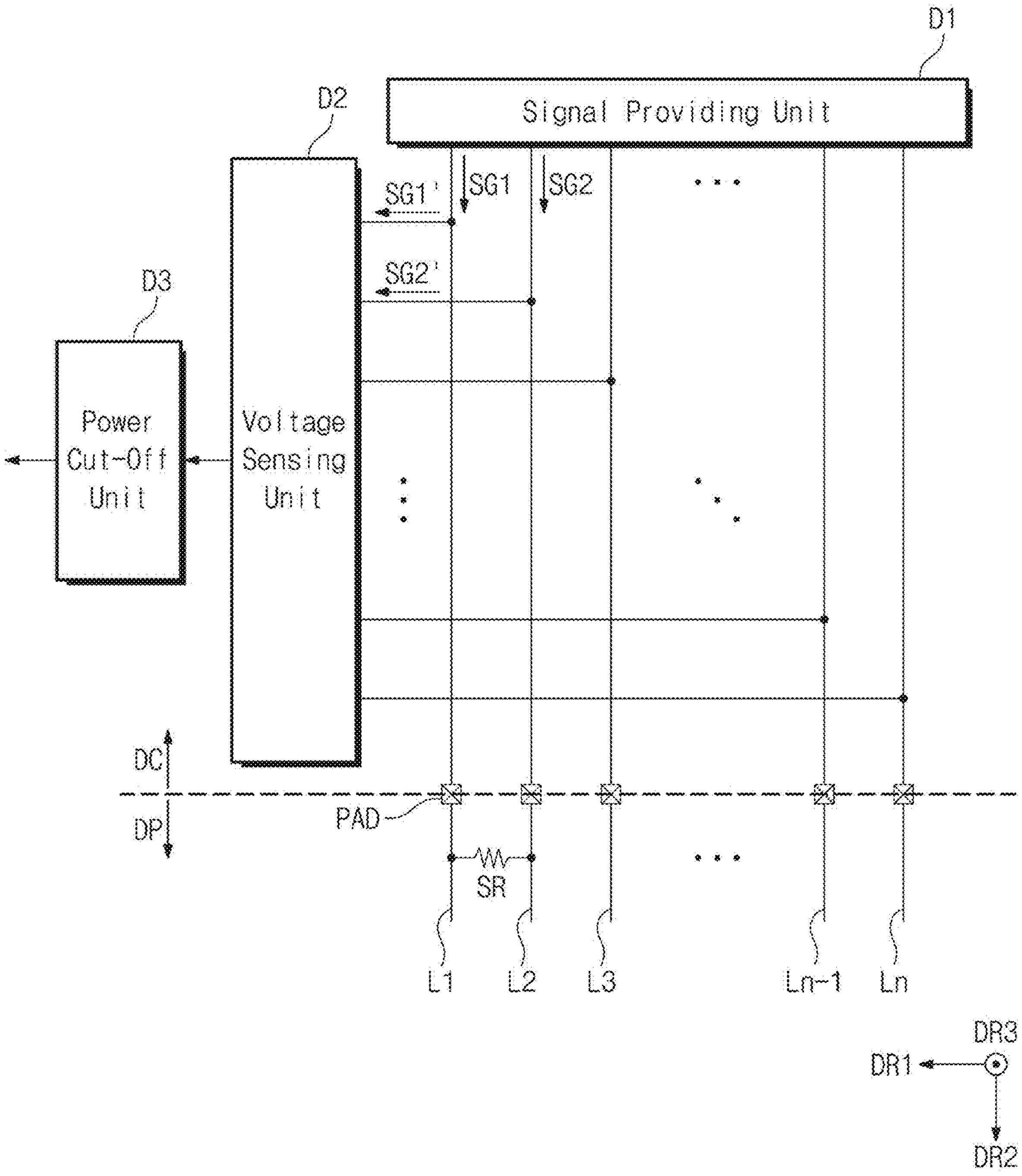
FIG. 9 is a block diagram schematically illustrating some components of an electronic device according to an embodiment of the present disclosure.

FIG. 9 is a block diagram schematically illustrating some components of an electronic device according to an embodiment of the present disclosure.

Referring to FIGS. 8 and 9, the electronic device 1000 (e.g., see FIG. 2) may include the display panel DP and a driving circuit DC.

The display panel DP may include a plurality of lines L1 to Ln, where 'n' may be a natural number equal to or greater than five. The plurality of lines L1 to Ln may include a first L1, a second line L2, a third line L3, an (n−1)-th line Ln−1, and an n-th line Ln.

The driving circuit DC may drive the display panel DP. The driving circuit DC may be connected to the plurality of lines L1 to Ln through the plurality of pad parts PAD. The driving circuit DC may correspond to the data driver DIC (e.g., see FIG. 6) or the sensor driver 200C.

When the driving circuit DC corresponds to the data driver DIC (e.g., see FIG. 6), the plurality of lines L1 to Ln may correspond to the plurality of data lines DL, respectively. The plurality of lines L1 to Ln may be electrically connected to the plurality of pixels PX, respectively. The driving circuit DC may provide the data signal Vdata to the plurality of lines L1 to Ln.

When the driving circuit DC corresponds to the sensor driver 200C (e.g., see FIG. 6), the plurality of lines L1 to Ln may correspond to the plurality of sensing lines TL1 (e.g., see FIG. 7), respectively. The plurality of line L1 to Ln may be electrically connected to the plurality of first electrodes TE1, respectively. The driving circuit DC may provide the sensing signal TX to the plurality of lines L1 to Ln.

The driving circuit DC may determine whether or not a short circuit occurs between two adjacent lines among the plurality of lines L1 to Ln. For example, when the short circuit occurs between the first line L1 and the second line L2, a short resistor SR may be formed between the first line L1 and the second line L2. When the short state occurs, the driving circuit DC may perform an operation for protecting the display panel DP.

The driving circuit DC may include a signal providing unit (e.g., a signal providing circuit) D1, a voltage sensing unit (e.g., a voltage sensing circuit) D2, and a power cut-off unit (e.g., a power cut-off circuit) D3.

The signal providing unit D1 may provide a first signal SG1 and a second signal SG2 to two adjacent lines among the plurality of lines L1 to Ln, respectively (S100). The first signal SG1 and the second signal SG2 may be different from each other.

The first signal SG1 and the second signal SG2 may have a direct current (DC) voltage. The voltage level of the first signal SG1 may be higher than the voltage level of the second signal SG2.

The signal providing unit D1 may sequentially provide the first signal SG1 to each of the plurality of lines L1 to Ln. The signal providing unit D1 may provide the second signal SG2 to another line adjacent to the line applied with the first signal SG1. For example, after providing the first signal SG1 and the second signal SG2 to the first line L1 and the second line L2, respectively, the signal providing unit D1 may provide the first signal SG1 and the second signal SG2 to the second line L2 and the third line L3, respectively.

The voltage sensing unit D2 may sense a voltage of each of two lines adjacent to each other (S200). For example, the voltage sensing unit D2 may sense the voltage of each of the first line L1 and the second line L2. The voltage sensing unit D2 may sense a first voltage SG1' of the first line L1, and may sense a second voltage SG2' of the second line L2. The first voltage SG1' may correspond to the first signal SG1, and the second voltage SG2' may correspond to the second signal SG2.

The power cut-off unit D3 may cut off the power of the display panel DP for a recovery period (e.g., the specific or predetermined recovery period), in response to the signal of the voltage sensing unit D2 (S300). The power cut-off unit D3 may control the power supply circuit 1000P (e.g., see FIG. 4) to cut off the power of the display panel DP.

The driving circuit DC may control the display panel DP to re-drive the display panel DP after the recovery period (e.g., the specific or predetermined recovery period) (S400). The driving circuit DC may determine whether or not a short circuit still occurs between two adjacent lines among the plurality of lines L1 to Ln, and may re-drive the display panel DP when it is determined that the short circuit does not occur.

Figure 10:
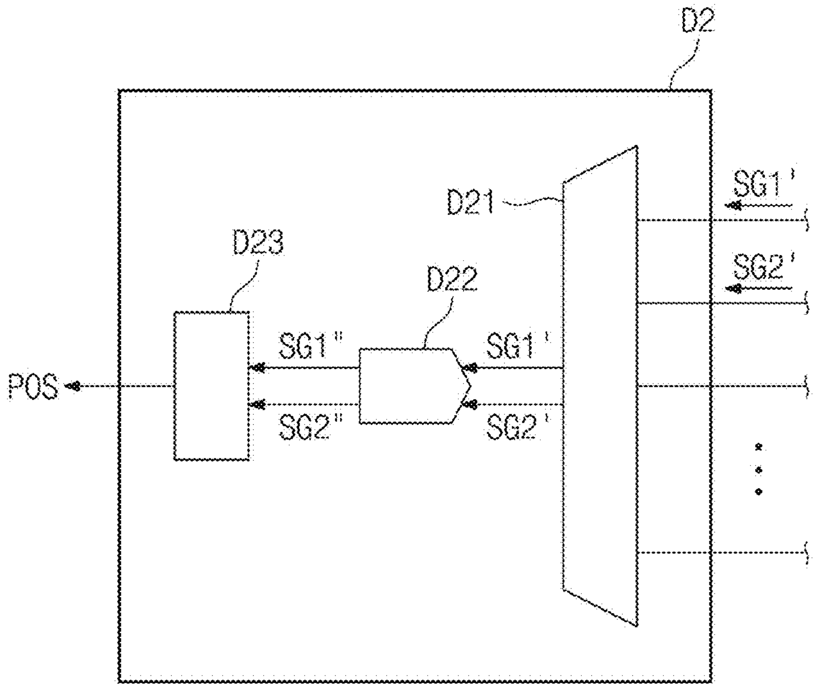
FIG. 10 is a block diagram schematically illustrating a voltage sensing unit according to an embodiment of the present disclosure.
Figure 11:
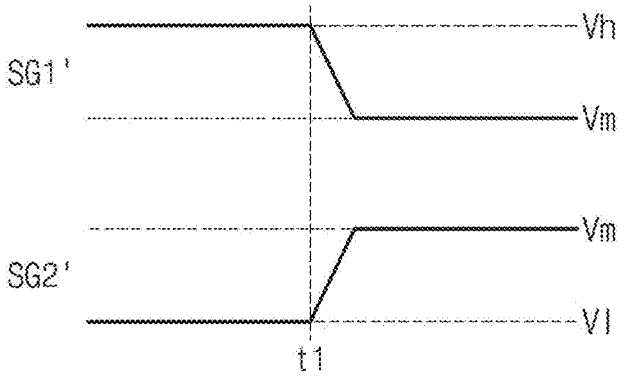
FIG. 11 is a timing diagram illustrating a first voltage and a second voltage according to an embodiment of the present disclosure.

FIG. 10 is a block diagram schematically illustrating a voltage sensing unit according to an embodiment of the present disclosure. FIG. 11 is a timing diagram illustrating a first voltage and a second voltage according to an embodiment of the present disclosure.

Referring to FIGS. 9 to 11, the voltage sensing unit D2 may include a MUX circuit D21, an analog-digital converter D22, and a controller D23.

The MUX circuit D21 may be electrically connected to the plurality of lines L1 to Ln. The MUX circuit D21 may select two lines among the plurality of lines L1 to Ln, to output signals input through the selected lines. For example, the MUX circuit D21 may output a first voltage SG1' and a second voltage SG2'.

The MUX circuit D21 may sequentially select the plurality of lines L1 to Ln, and may additionally select another line adjacent to the selected line. For example, the MUX circuit D21 may select the second line L2 and the third line L3, after selecting the first line L1 and the second line L2.

The analog-digital converter D22 may convert an analog signal to a digital signal. The analog-digital converter D22 may receive the first voltage SG1' and the second voltage SG2'. The analog-digital converter D22 may transmit a first voltage SG1", which is converted to a digital signal, and a second voltage SG2", which is converted to a digital signal, to the controller D23.

The controller D23 may generate a shut-down signal POS based on the first voltage SG1" and the second voltage SG2". The shut-down signal POS may be provided to the power cut-off unit D3.

In a normal state, the first voltage SG1' may have a first voltage level Vh, and the second voltage SG2' may have a second voltage level Vl. For example, the first signal SG1 may have a DC voltage having the first voltage level Vh, and the second signal SG2 may have a DC voltage having the second voltage level Vl.

A short circuit may occur due to an Electro-Chemical Migration (ECM) failure between mutually-different lines in a state in which the display panel DP is exposed under a higher temperature and a higher moisture environment. For example, when the short circuit occurs between the first line L1 and the second line L2, the short resistor SR may be formed between the first line L1 and the second line L2.

The first line L1 and the second line L2 that are adjacent to each other may be electrically connected to each other by the short resistor SR.

When the short circuit occurs at a first time point t1, the voltage level of the first line L1 may become equal to or substantially equal to the voltage level of the second line L2. Each of the first voltage SG1' and the second voltage SG2' may have a third voltage level (Vm). For example, the third voltage level (Vm) may have an intermediate value between the first voltage level (Vh) and the second voltage level (Vl).

The controller D23 may generate the shut-down signal POS by determining that the short circuit occurs, when the voltage level of the first voltage SG1" is equal to or substantially equal to the voltage level of the second voltage SG2".

The power cut-off unit D3 may cut off the power of the display panel DP based on the shut-down signal POS. For example, the power cut-off unit D3 may cut off the power of the display panel DP, when the voltage level of the first line L1 is equal to or substantially equal to the voltage level of the second line L2.

Figure 12:
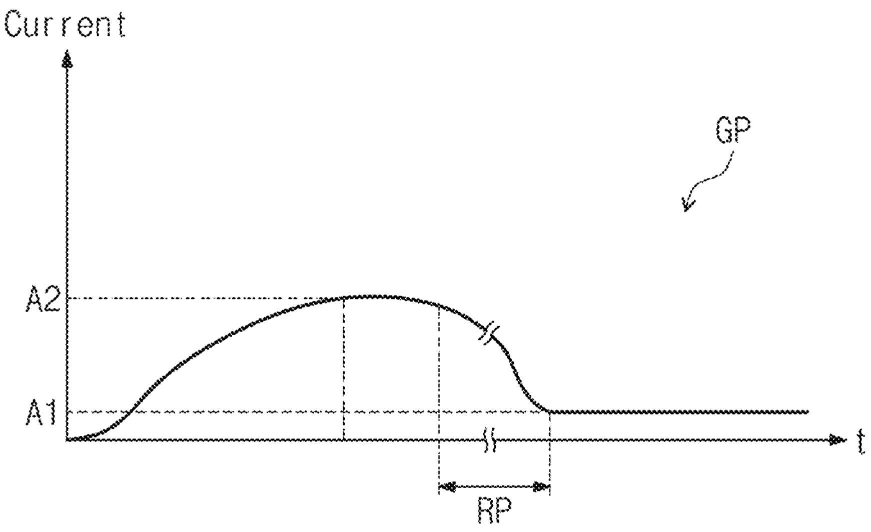
FIG. 12 is a graph illustrating a current as a function of time according to an embodiment of the present disclosure.

FIG. 12 is a graph illustrating a current as a function of time according to an embodiment of the present disclosure.

Referring to FIGS. 9 and 12, a graph GP illustrates a current flowing through the electronic device 1000 over time t, when a short circuit occurs under a higher temperature and a higher moisture environment.

When the short circuit occurs, the current flowing through the display panel DP may be increased from a first current A1 to a second current A2. For example, the first current A1 may be 5 Å (ampere), and the second current A2 may be 6 Å.

When the power of the display panel DP is not instantly cut off, a permanent dead pixel may be caused due to an excessive current, unlike in some embodiments of the present disclosure. However, according to some embodiments of the present disclosure, when the short state occurs, the driving circuit DC may perform an operation for protecting the display panel DP. Accordingly, the electronic device 1000 (e.g., see FIG. 1) having an improved reliability may be provided.

The driving circuit DC may block the power of the display panel DP for a recover period (e.g., the specific or predetermined recovery period) RP based on the first voltage SG1' and the second voltage SG2'.

The higher temperature and the higher moisture environment may be recovered to the normal environment after the recovery period RP. For example, the recovery period RP may range from 1 hour to 12 hours. The temperature may be decreased, and the humidity may be reduced, during the recovery period RP. However, the present disclosure is not limited thereto. For example, the recovery period RP may be variously modified as needed or desired, or may be varied.

The signal providing unit D1 may re-determine the short state of the plurality of lines L1 to Ln after the recovery period RP. The signal providing unit D1 may re-provide the first signal SG1 and the second signal SG2.

As the display panel DP normally operates after the recovery period RP, the current flowing through the display panel DP may have the first current A1.

According to some embodiments of the present disclosure, the short state may be more easily sensed between the plurality of lines L1 to Ln through the signal providing unit D1 and the voltage sensing unit D2. When the short state occurs, the driving circuit DC may perform an operation for protecting the display panel DP. The driving circuit DC may cut off the power of the display panel DP for the recovery period (e.g., the specific or predetermined recovery period) RP. The higher temperature and the higher moisture environment may be recovered to the normal environment after the recovery period RP ends. The display panel DP may be re-driven after being recovered to the normal environment. Accordingly, the electronic device 1000 (e.g., see FIG. 1) having an improved reliability, and a method for driving the electronic device 1000, may be provided.

Figure 13:
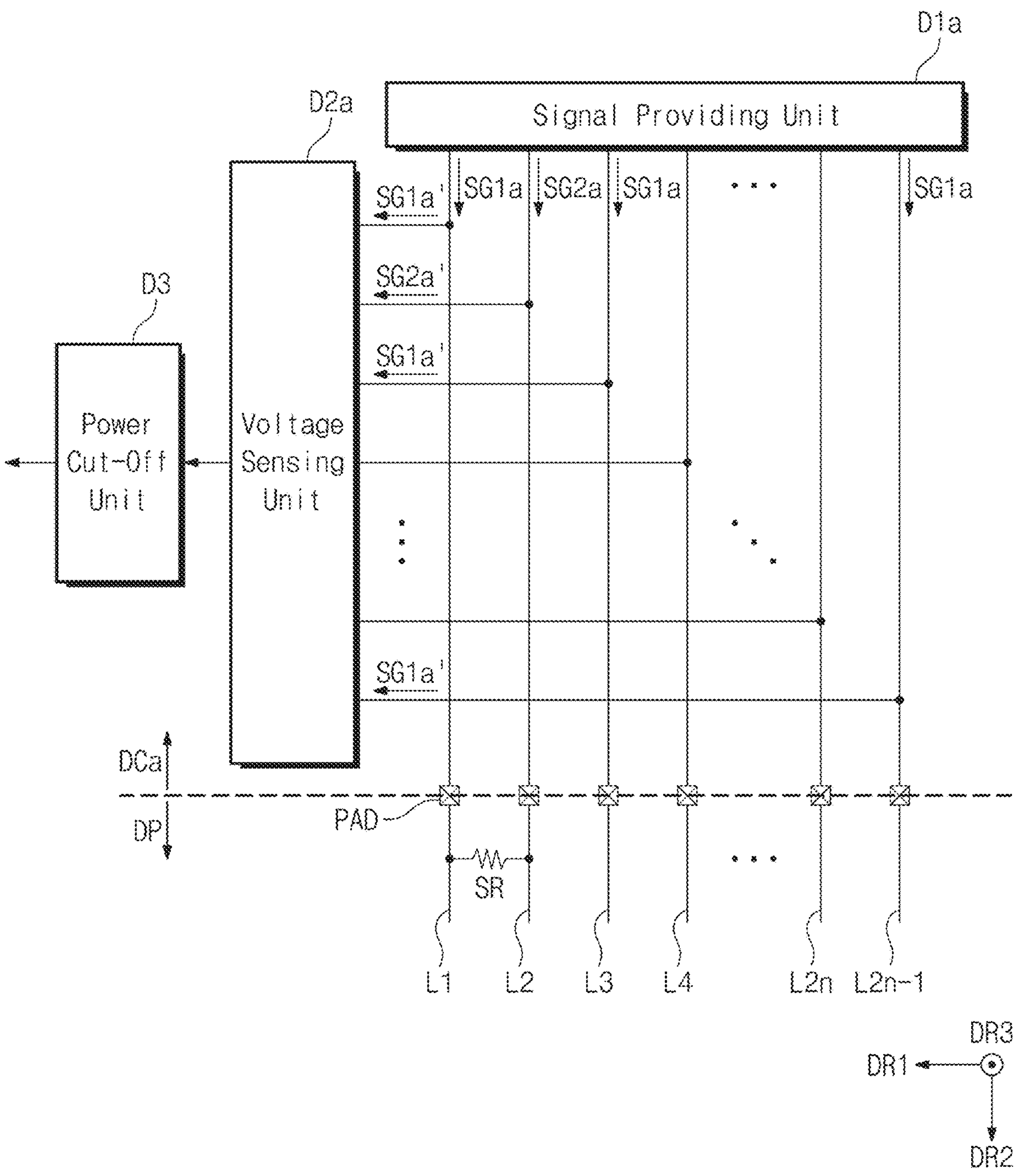
FIG. 13 is a block diagram schematically illustrating a portion of an electronic device according to an embodiment of the present disclosure.
Figure 14:
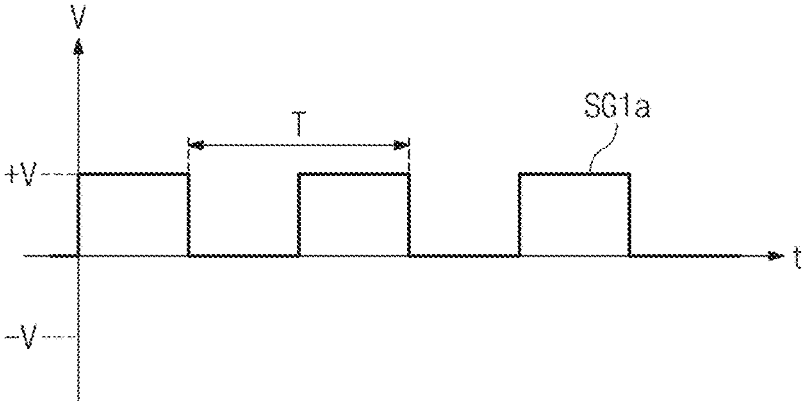
FIG. 14 is a waveform diagram illustrating a first signal according to an embodiment of the present disclosure.
Figure 15:
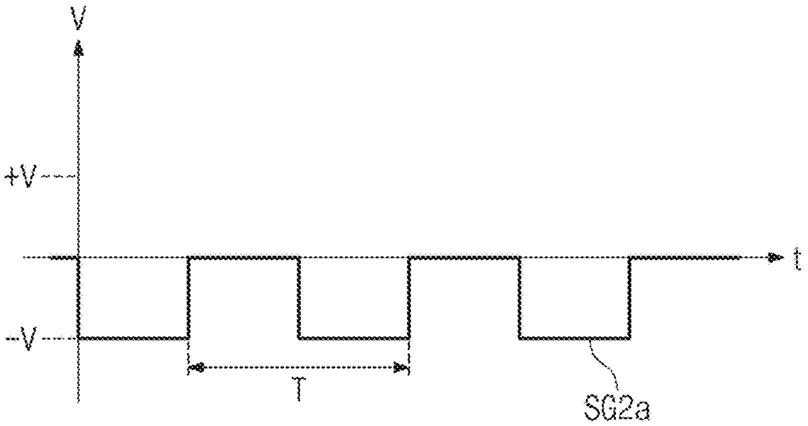
FIG. 15 is a waveform diagram illustrating a second signal according to an embodiment of the present disclosure.

FIG. 13 is a block diagram schematically illustrating a portion of an electronic device according to an embodiment of the present disclosure. FIG. 14 is a waveform diagram illustrating a first signal according to an embodiment of the present disclosure. FIG. 15 is a waveform diagram illustrating a second signal according to an embodiment of the present disclosure. In FIG. 13, the components that are the same or substantially the same as those described above with reference to FIG. 9 are assigned with the same reference numerals, and thus, redundant description thereof may not be repeated.

Referring to FIGS. 13 to 15, a driving circuit DCa may determine whether or not a short circuit occurs between two adjacent lines among the plurality of lines L1 to Ln. For example, when the short circuit occurs between the first line L1 and the second line L2, the short resistor SR may be formed between the first line L1 and the second line L2. When the short state occurs, the driving circuit DCa may perform an operation for protecting the display panel DP.

The driving circuit DC may include a signal providing unit (e.g., a signal providing circuit) D1*a*, a voltage sensing unit (e.g., a voltage sensing circuit) D2*a*, and the power cut-off unit D3.

The signal providing unit D1*a* may concurrently (e.g., simultaneously or substantially simultaneously) provide a first signal SG1*a* to some of the plurality of lines L1 to Ln. The some lines may be even-numbered lines L2, L4, and L2*n*.

The first signal SG1*a* may have an alternating current (AC) voltage. The first signal SG1*a* may repeatedly have the first voltage level and a ‘0’ V (volt) level in a cycle (e.g., a specific or predetermined cycle) (T). The first voltage level may be defined as ‘+v’.

The signal providing unit D1*a* may sequentially provide the second signal SG2*a* to the other remaining lines among the plurality of lines L1 to Ln. The other remaining lines may be odd-numbered lines L1, L3, and L2*n*−1. The second signal SG2*a* may be sequentially provided to the first line L1, the third line L3, and up to the (2n−1)-th line L2*n*−1.

The second signal SG2*a* may have an alternating current (AC) voltage. The second signal SG2*a* may repeatedly have the second voltage level and the ‘0’ V (volt) level in a cycle (e.g., a specific or predetermined cycle) (T). The second voltage level may be defined as ‘-v’. The second signal SG2*a* may have a phase inverse to a phase of the first signal SG1*a*.

The voltage sensing unit D2*a* may sense a voltage from each of one even-numbered line among the even-numbered lines L2, L4, and L2*n*, and an odd-numbered line, which is adjacent to the even-numbered line, among the odd-numbered lines L1, L3, and L2*n*-1. For example, the voltage sensing unit D2*a* may sense the voltage of each of the first line L1 and the second line L2. The voltage sensing unit D2*a* may sense the first voltage SG1*a*' of the first line L1, and may sense the second voltage SG2*a*' of the second line L2. The first voltage SG1*a*' may correspond to the first signal SG1*a*, and the second voltage SG2*a*' may correspond to the second signal SG2*a*.

The power cut-off unit D3 may cut off the power of the display panel DP for the recovery period (e.g., the specific or predetermined recovery period), in response to the signal of the voltage sensing unit D2 (S300). The power cut-off unit D3 may control the power circuit 1000P (e.g., see FIG. 4) to cut off the power of the display panel DP.

The driving circuit DCa may control the display panel DP to re-drive display panel DP after the specific recovery period ends (S400). The driving circuit DC may determine whether or not a short circuit still occurs between two adjacent lines among the plurality of lines L1 to Ln, and may re-drive the display panel DP when it is determined that the short circuit does not occur.

Figure 16:
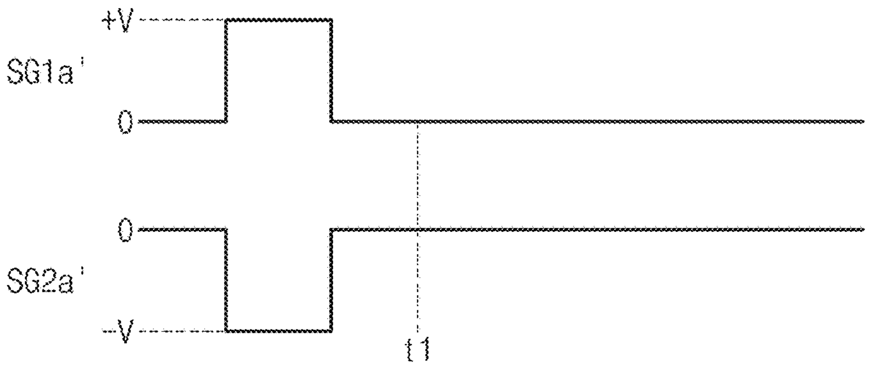
FIG. 16 is a timing diagram illustrating a first voltage and a second voltage according to an embodiment of the present disclosure.

FIG. 16 is a timing diagram illustrating a first voltage and a second voltage according to an embodiment of the present disclosure.

Referring to FIGS. 13 and 16, when the short circuit occurs at a first time point (t1), the voltage level of the first line L1 may be equal to or substantially equal to the voltage level of the second line L2. Each of the first signal SG1*a*' and the second signal SG2*a*' may have ‘0’ V.

The voltage sensing unit D2 may transmit a signal to the power cut-off unit D3 by determining that the short circuit occurs, when the first voltage SG1" and the second voltage SG2" are ‘0’ V.

For example, the power cut-off unit D3 may cut off the power of the display panel DP when the first line L1 and the second line L2 are ‘0’ V (volt).

According to some embodiments of the present disclosure, the short state may be more easily sensed between the plurality of lines L1 to Ln through the signal providing unit D1*a* and the voltage sensing unit D2*a*. When the short state occurs, the driving circuit DCa may perform an operation for protecting the display panel DP. The driving circuit DCa may cut off the power of the display panel DP for a recovery period (e.g., the specific or predetermined recovery period) RP. The higher temperature and the higher moisture environment may be recovered to the normal environment after the recovery period RP. The display panel DP may be re-driven after being recovered to the normal environment. Accordingly, the electronic device 1000 (e.g., see FIG. 1) having an improved reliability, and a method for driving the same, may be provided.

As described above, the short state may be more easily sensed between the plurality of lines through the signal providing unit and the voltage sensing unit. The driving circuit may perform an operation for protecting the display panel when the short state is caused. The driving circuit may cut off the power of the display panel for a recovery period. The higher temperature and the higher moisture environment may be recovered to the normal environment after the recovery period. The display panel may be re-driven after being recovered to the normal environment. Accordingly, the electronic device having an improved reliability, and a method for driving the same, may be provided.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising:

a display panel comprising a plurality of lines, the plurality of lines comprising:

a first line; and a second line adjacent to the first line; and a driving circuit configured to drive the display panel, and comprising:

a signal providing unit configured to provide a first signal to the first line, and a second signal different from the first signal to the second line;

a voltage sensing unit configured to sense a voltage of each of the first line and the second line; and a power cut-off unit configured to cut off power of the display panel for a recovery period, based on the voltage, wherein the driving circuit is configured to re-drive the display panel after the recovery period.

2. The electronic device of claim 1, wherein the display panel further comprises:

a display layer comprising a plurality of pixels; and a sensor layer on the display layer, and comprising a plurality of sensing electrodes.

3. The electronic device of claim 2, wherein the plurality of lines are electrically connected to the plurality of pixels, and wherein the driving circuit is configured to provide a data signal to the plurality of lines.

4. The electronic device of claim 2, wherein the plurality of lines are electrically connected to the plurality of sensing electrodes, and wherein the driving circuit is configured to provide a sensing signal to the plurality of lines.

5. The electronic device of claim 1, wherein each of the first signal and the second signal has a direct current (DC) voltage, and wherein a voltage level of the first signal is higher than a voltage level of the second signal.

6. The electronic device of claim 5, wherein the power cut-off unit is configured to cut off the power of the display panel when the voltage of the first line and the voltage of the second line have equal voltage levels as each other.

7. The electronic device of claim 5, wherein the voltage sensing unit comprises a multiplexer (MUX) circuit electrically connected to the plurality of lines, and the MUX circuit is configured to sequentially select the plurality of lines, and select another line adjacent to a selected line from among the plurality of lines.

8. The electronic device of claim 7, wherein the MUX circuit is configured to output a first voltage and a second voltage corresponding to the first signal and the second signal, respectively.

9. The electronic device of claim 1, wherein each of the first signal and the second signal has an alternating current (AC) voltage, and wherein the first signal has a phase inverse to a phase of the second signal.

10. The electronic device of claim 9, wherein the power cut-off unit is configured to cut off the power of the display panel when the voltage is equal to '0' V (volt).

11. The electronic device of claim 9, wherein the signal providing unit is configured to concurrently provide the first signal to some lines among the plurality of lines, and sequentially provide the second signal to other remaining lines among the plurality of lines.

12. The electronic device of claim 11, wherein the some lines are odd-numbered lines, and the other remaining lines are even-numbered lines.

13. The electronic device of claim 1, wherein the signal providing unit is configured to re-provide the first signal and the second signal after the recovery period is elapsed.

* * * * *